(12) United States Patent
    Horiguchi

(10) Patent No.: US 11,169,009 B2
(45) Date of Patent: Nov. 9, 2021

(54) ENCODER APPARATUS, ROBOT APPARATUS, AND METHOD FOR MEASURING GAP

(71) Applicant: CANON KABUSHIKI KAISHA, Tokyo (JP)

(72) Inventor: Haruhiko Horiguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 240 days.

(21) Appl. No.: 16/202,971

(22) Filed: Nov. 28, 2018

(65) Prior Publication Data

US 2019/0178687 A1    Jun. 13, 2019

(30) Foreign Application Priority Data

Dec. 11, 2017  (JP) .............................. JP2017-237063

(51) Int. Cl.
    *G01D 5/34*     (2006.01)
    *G01D 5/347*    (2006.01)
    *B25J 13/08*    (2006.01)

(52) U.S. Cl.
    CPC ........ *G01D 5/34715* (2013.01); *B25J 13/088* (2013.01); *G01D 5/3473* (2013.01); *G01D 5/34746* (2013.01); *G01D 5/34776* (2013.01); *G01D 5/34792* (2013.01)

(58) Field of Classification Search
    CPC ............. G01D 5/34776; G01D 5/3473; G01D 5/34792; G01D 5/34746; G01D 5/34715; B25J 9/1674; B25J 13/088
    USPC ..................................................... 250/231.1
    See application file for complete search history.

(56) References Cited

U.S. PATENT DOCUMENTS

| 4,676,002 A * | 6/1987 | Slocum ................. B25J 9/046 33/1 MP |
| 2007/0047050 A1* | 3/2007 | Igaki ................. G01D 5/34715 359/224.1 |
| 2009/0231574 A1* | 9/2009 | Vogel ................. G01D 5/3473 356/154 |
| 2011/0004343 A1* | 1/2011 | Iida ............................ B25J 9/12 700/253 |
| 2015/0273692 A1* | 10/2015 | Ogawara ............... B25J 19/021 700/253 |
| 2016/0003646 A1* | 1/2016 | Yoshida ................. H02K 11/22 310/68 B |

(Continued)

FOREIGN PATENT DOCUMENTS

JP        2013-113634        6/2013

*Primary Examiner* — Seung C Sohn
*Assistant Examiner* — Kevin Wyatt
(74) *Attorney, Agent, or Firm* — Venable LLP

(57) ABSTRACT

An encoder apparatus includes an encoder and a processor. The encoder includes a scale portion, a light emitting portion, and a light receiving portion. The scale portion includes a first track and a second track. The processor obtains a plurality of candidate values of a gap between the light emitting portion and the scale portion on a basis of an amplitude of a first signal obtained by receiving light reflected on or transmitted through the first track by the light receiving portion. The processor determines a measured value from among the plurality of candidate values on a basis of an amplitude of a second signal obtained by receiving light reflected on or transmitted through the second track by the light receiving portion.

18 Claims, 17 Drawing Sheets

(56) References Cited

U.S. PATENT DOCUMENTS

2018/0094924 A1   4/2018   Horiguchi

\* cited by examiner

ENCODER APPARATUS, ROBOT APPARATUS, AND METHOD FOR MEASURING GAP

BACKGROUND OF THE INVENTION

Field of the Invention

The present invention relates to a technique of measuring a gap.

Description of the Related Art

In recent years, an articulated robot has been used in a production line in a factory or the like. The position of a hand of a robot is important for causing the robot to perform a precise assembly operation. An optical encoder used for position control of the robot is disposed at a joint of the robot.

The optical encoder includes a light source, a scale that reflects or transmits light emitted from the light source and is relatively movable with respect to the light source, and a light receiving element that receives light that has been reflected on or transmitted through the scale. The scale is disposed on one of a pair of links included in the robot, and the light source is disposed on the other. A plurality of pattern elements arranged in parallel in a direction in which the scale relatively moves with respect to the light source and the light receiving element are formed in the scale, and the amount of light received by the light receiving element changes in accordance with the relative movement of the scale. Therefore, the amount of movement of the scale and the angle of the joint of the robot can be obtained on the basis of a signal corresponding to the change in the amount of light received by the light receiving element.

The light source and the scale need to be used with an appropriate gap therebetween so as to be out of contact with each other. Japanese Patent Laid-Open No. 2013-113634 discloses a technique of measuring the amount of a gap by using a linear encoder.

However, the method disclosed in Japanese Patent Laid-Open No. 2013-113634 has a problem that a measurable range of the gap decreases as the resolution of the encoder increases. This will be described in more details below. FIG. 17 is a graph illustrating a relationship between a gap and a signal amplitude in a prior art. The amplitude of a signal obtained by the light receiving element corresponds to the gap. Therefore, the gap can be measured by monitoring the amplitude of the signal. However, the amplitude of the signal periodically changes like, for example, a waveform of a sine wave shape inverted to the positive side at an amplitude of 0 with respect to the change of the gap. In the example of FIG. 17, the inversion occurs at a gap of 3.6 mm, and one period of the periodic change is 7.2 mm. In this manner, since the amplitude of the signal periodically changes with respect to the gap, there is a problem that the period becomes shorter and the measurable range of the gap becomes narrower as the resolution of the encoder becomes higher.

SUMMARY OF THE INVENTION

According to one aspect of the present invention, an encoder apparatus includes an encoder and a processor. The encoder includes a scale portion, a light emitting portion, and a light receiving portion. The scale portion includes a first track including a plurality of first pattern elements periodically arranged at a first pitch, and a second track including a plurality of second pattern elements periodically arranged at a second pitch larger than the first pitch. The light emitting portion is configured to radiate light onto the first track and the second track. The light receiving portion is configured to receive light reflected on or transmitted through the first track and light reflected on or transmitted through the second track. The processor is configured to obtain a measured value of a gap between the light emitting portion and the scale portion. The processor obtains a plurality of candidate values of the gap between the light emitting portion and the scale portion on a basis of an amplitude of a first signal obtained by receiving the light reflected on or transmitted through the first track by the light receiving portion, and determines the measured value from among the plurality of candidate values on a basis of an amplitude of a second signal obtained by receiving the light reflected on or transmitted through the second track by the light receiving portion.

According to a second aspect of the present invention, a robot apparatus includes a robot and a controller. The robot includes a first link, a second link movably coupled to the first link via a joint, a driving portion configured to drive the second link with respect to the first link, and an encoder. The encoder includes a scale portion, a light emitting portion, and a light receiving portion. The scale portion includes a first track including a plurality of first pattern elements periodically arranged at a first pitch, and a second track including a plurality of second pattern elements periodically arranged at a second pitch larger than the first pitch. The light emitting portion is configured to radiate light onto the first track and the second track. The light receiving portion is configured to receive light reflected on or transmitted through the first track and light reflected on or transmitted through the second track. The controller is configured to control an operation of the driving portion. The light emitting portion and the light receiving portion are provided at one of the first link and the second link. The scale portion is provided at the other of the first link and the second link.

According to a third aspect of the present invention, a method for measuring a gap, the method includes preparing an encoder including a scale portion, a light emitting portion, and a light receiving portion. The scale portion includes a first track including a plurality of first pattern elements periodically arranged at a first pitch, and a second track including a plurality of second pattern elements periodically arranged at a second pitch larger than the first pitch. The light emitting portion is configured to radiate light onto the first track and the second track. The light receiving portion is configured to receive light reflected on or transmitted through the first track and light reflected on or transmitted through the second track. The method includes obtaining a plurality of candidate values of a gap between the light emitting portion and the scale portion on a basis of an amplitude of a first signal obtained by receiving the light reflected on or transmitted through the first track by the light receiving portion, and obtaining a measured value of the gap between the light emitting portion and the scale portion from among the plurality of candidate values on a basis of an amplitude of a second signal obtained by receiving the light reflected on or transmitted through the second track by the light receiving portion.

Further features of the present invention will become apparent from the following description of exemplary embodiments with reference to the attached drawings.

DESCRIPTION OF THE EMBODIMENTS

Exemplary embodiments of the present invention will be described below with reference to drawings.

First Exemplary Embodiment

Figure 1:
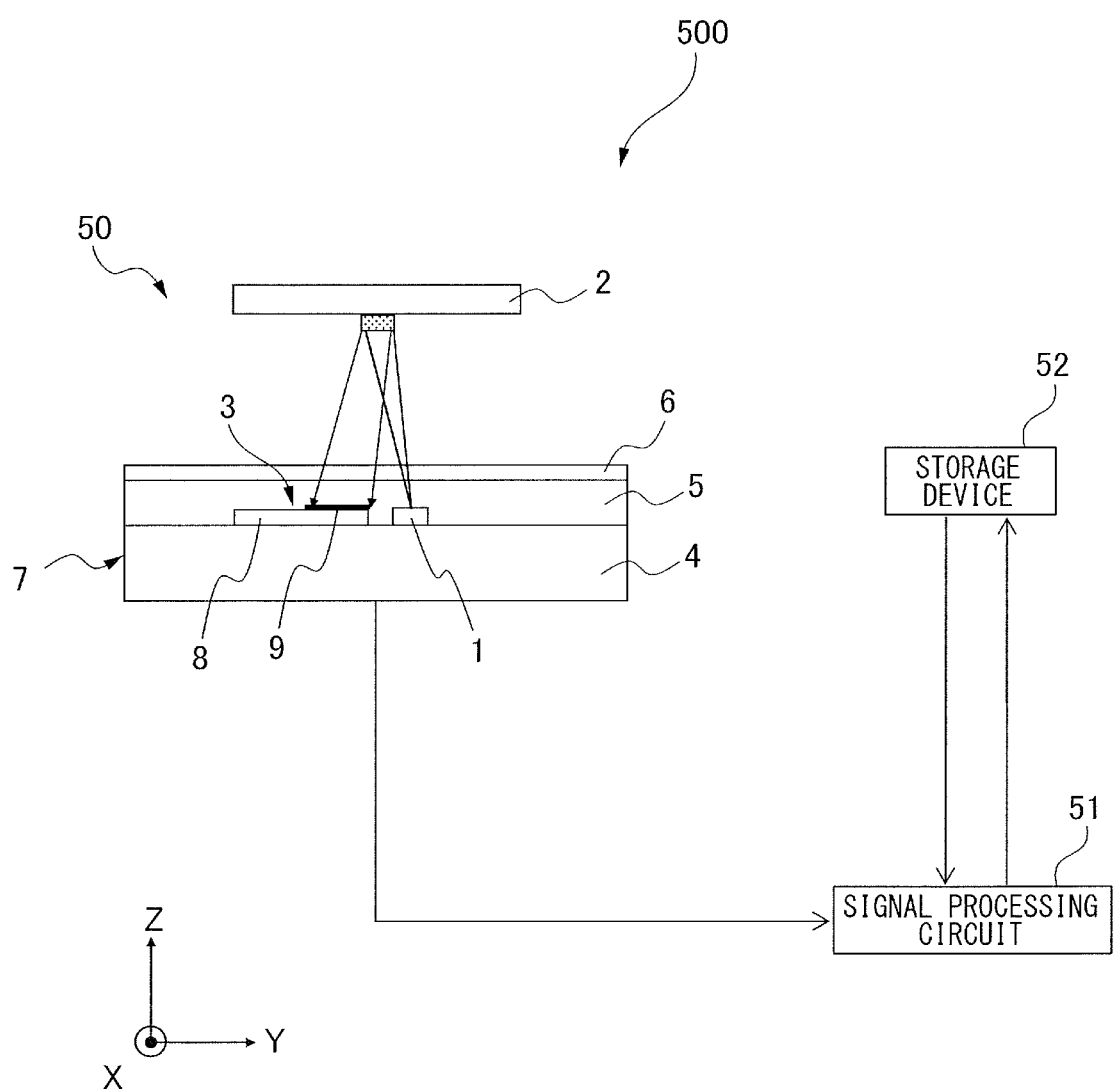
FIG. 1 is a schematic diagram of an encoder apparatus according to a first exemplary embodiment.

FIG. 1 is a schematic diagram of an encoder apparatus according to a first exemplary embodiment. An encoder apparatus 500 illustrated in FIG. 1 includes an encoder 50, a signal processing circuit 51 serving as an example of a processing portion, and a storage device 52 serving as an example of a storage portion. The encoder 50 is an optical encoder of a light interference type that is a linear encoder of an incremental type. In addition, the encoder 50 is an encoder of a reflection type.

The encoder 50 includes a scale portion 2 attached to one of a fixed portion and a movable portion, and a head 7 attached to the other of the fixed portion and the movable portion and disposed opposite to the scale portion 2. For example, the scale portion 2 is attached to the movable portion, and the head 7 is attached to the fixed portion. The scale portion 2 relatively makes translation movement with respect to the head 7.

The movement direction of the scale portion 2 in which the scale portion 2 relatively makes translation movement with respect to the head 7 is referred to as an X direction, a direction which is perpendicular to the X direction and in which the head 7 and the scale portion 2 are opposed to each other is referred to as a Z direction, and a width direction perpendicular to the X direction and the Z direction is referred to as a Y direction.

The signal processing circuit 51 performs interpolation calculation of a signal obtained by the head 7, writes and reads signal data in and from the storage device 52, and outputs a signal indicating position information of the scale portion 2.

The head 7 includes a light source 1 and a sensor unit 3. The light source 1 is constituted by a light emitting diode: LED serving as an example of a light emitting portion. The sensor unit 3 includes a substrate 8, a light receiving element array 9 serving as an example of a light receiving portion mounted on the surface of the substrate 8. The light source 1 and the sensor unit 3 are mounted a printed wiring board 4, and are sealed by transparent resin 5 that transmits light. Glass 6 is disposed on the surface of the resin 5. According to this configuration, the light source 1 and the sensor unit 3 are protected by the resin 5 and the glass 6.

The signal processing circuit 51 and the storage device 52 are each constituted by, for example, a semiconductor element constituted by an integrated circuit chip: IC chip, and is mounted on the surface of the substrate 8. In FIG. 1, for the sake of convenience of description, the signal processing circuit 51 and the storage device 52 are illustrated as if the signal processing circuit 51 and the storage device 52 are not mounted on the substrate 8. To be noted, the positions of the signal processing circuit 51 and the storage device 52 are not limited to these, and the signal processing circuit 51 and the storage device 52 may be disposed in any positions. For example, the signal processing circuit 51 and the storage device 52 may be mounted on the printed wiring board 4 or on a printed wiring board different from the printed wiring board.

The scale portion 2 is constituted by a member that has a relatively low light reflectance and absorbs or transmits light, for example, a glass substrate, and a member that is formed on the glass substrate and has a relatively high light reflectance, for example, a chromium reflection film. For the sake of convenience of description, a portion having a relatively low light reflectance will be referred to as a "non-reflection portion", and a portion having a relatively high light reflectance will be referred to as a "reflection portion".

A light beam emitted from the light source 1 is radiated onto a part of the scale portion 2. The light beam radiated onto the scale portion 2 is reflected toward the light receiving element array 9, forms an image in which a reflectance distribution of the scale portion 2 is doubled in size on the light receiving element array 9, and is received by the light receiving element array 9. The light beam received by the light receiving element array 9 is photoelectrically converted into an electric signal and transmitted to the signal processing circuit 51.

Figure 2A:
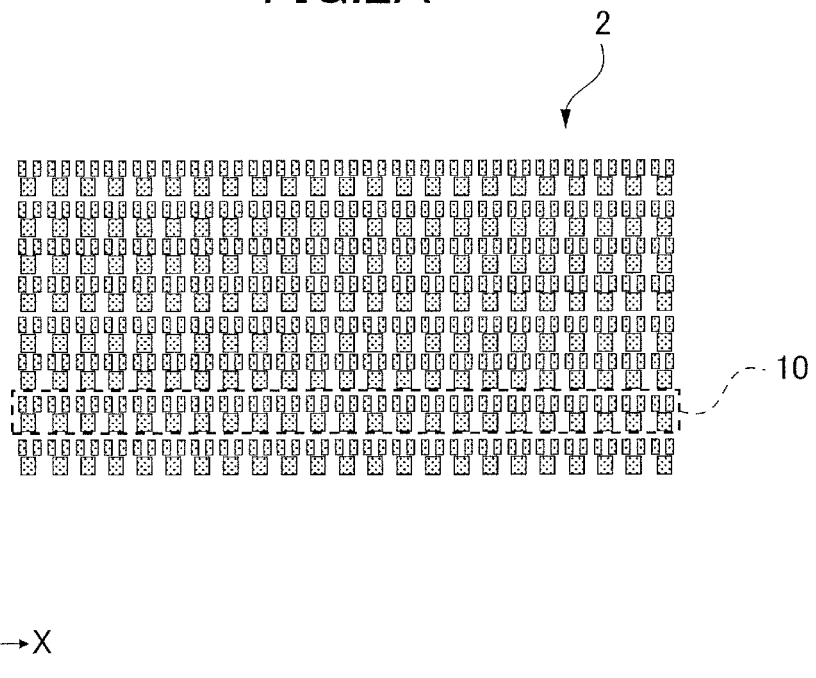
FIG. 2A is a plan view of a scale portion according to the first exemplary embodiment.
Figure 2B:
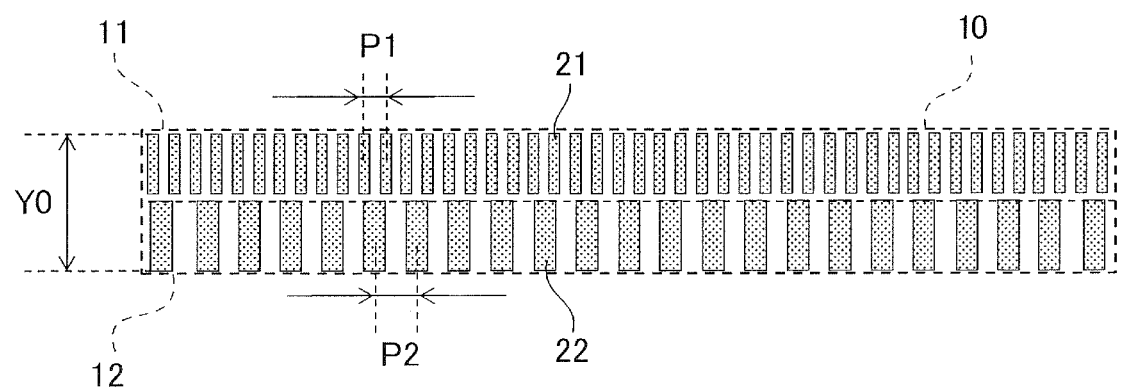
FIG. 2B is a plan view of a unit block of the scale portion according to the first exemplary embodiment.

FIG. 2A is a plan view of the scale portion 2. The scale portion 2 is constituted by a plurality of unit blocks 10, for example, eight unit blocks 10 arranged in the Y direction. FIG. 2B is a plan view of a unit block 10. The unit block 10 includes a track 11 constituted by a plurality of pattern elements 21 serving as first pattern elements periodically arranged in the X direction at a pitch P1. The track 11 serves as a first track and the pitch P1 serves as a first pitch. The unit block 10 also includes a track 12 constituted by a plurality of pattern elements 22 serving as second pattern elements periodically arranged in the X direction at a pitch P2 larger than the pitch P1. The track 12 serves as a second track and the pitch P2 serves as a second pitch. The pattern elements 21 and 22 are each constituted by reflection portions and non-reflection portions. In FIGS. 2A and 2B the reflection portions of each of the pattern elements 21 and 22 are shaded, and the non-reflection portions of each of the pattern elements 21 and 22 are blanked.

The unit block 10 has a width Y0 of, for example, 50 μm in the Y direction. The reflection portions and the non-reflection portions of the pattern elements 21 each have a length of, for example, 32 μm in the X direction. The pitch P1 of the pattern elements 21 is, for example, 64 μm. The reflection portions and the non-reflection portions of the pattern 22 each have a length of, for example, 64 μm in the X direction. The pitch P2 of the pattern 22 is, for example, 128 μm. In the first exemplary embodiment, the pitch P2 is double the pitch P1. The width of each of the pattern elements 21 and 22, that is, of each of the tracks 11 and 12 in the Y direction is, for example, 25 μm.

Figure 3:
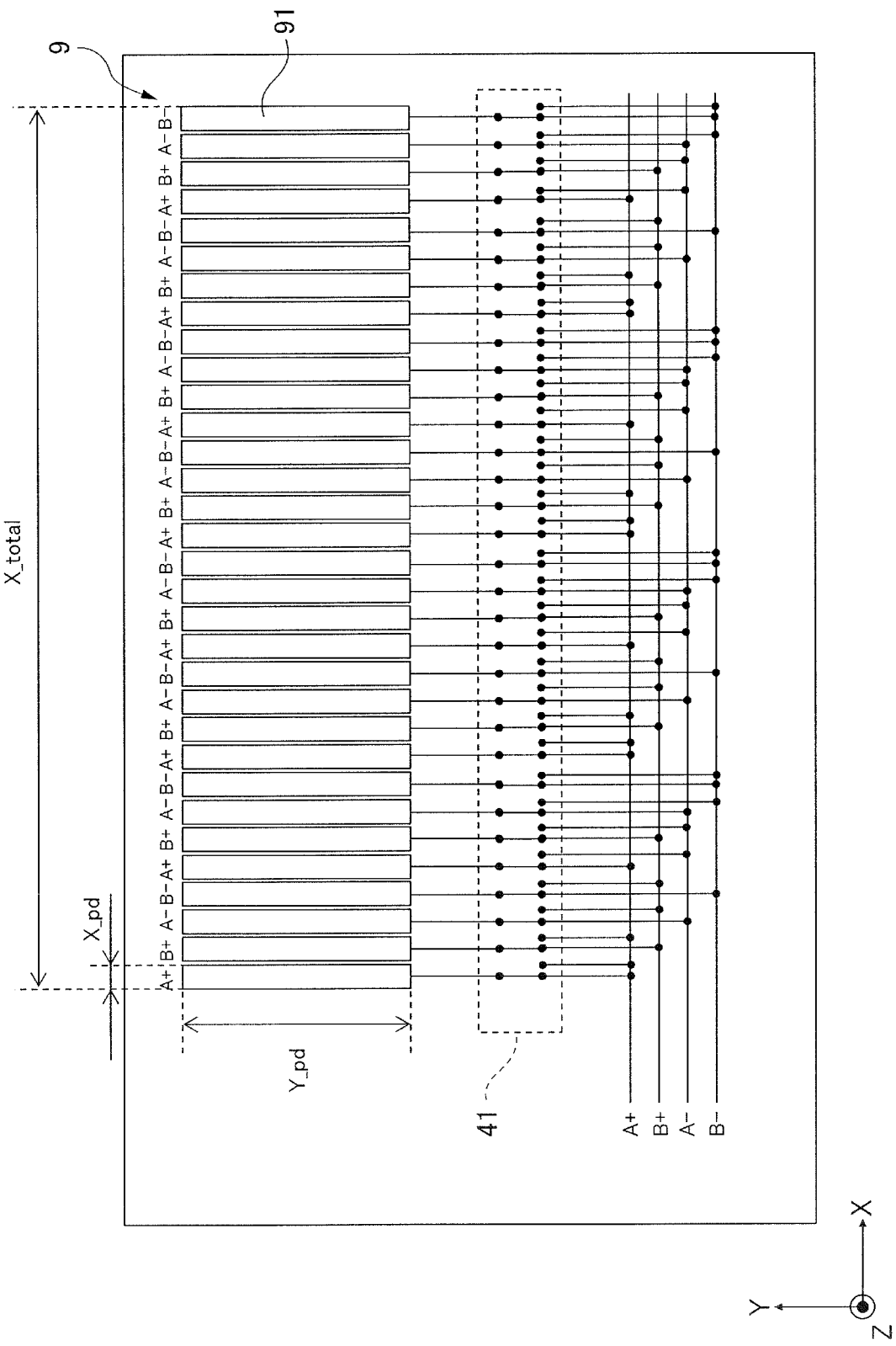
FIG. 3 is a plan view of a light receiving element array according to the first exemplary embodiment.
Figure 4:
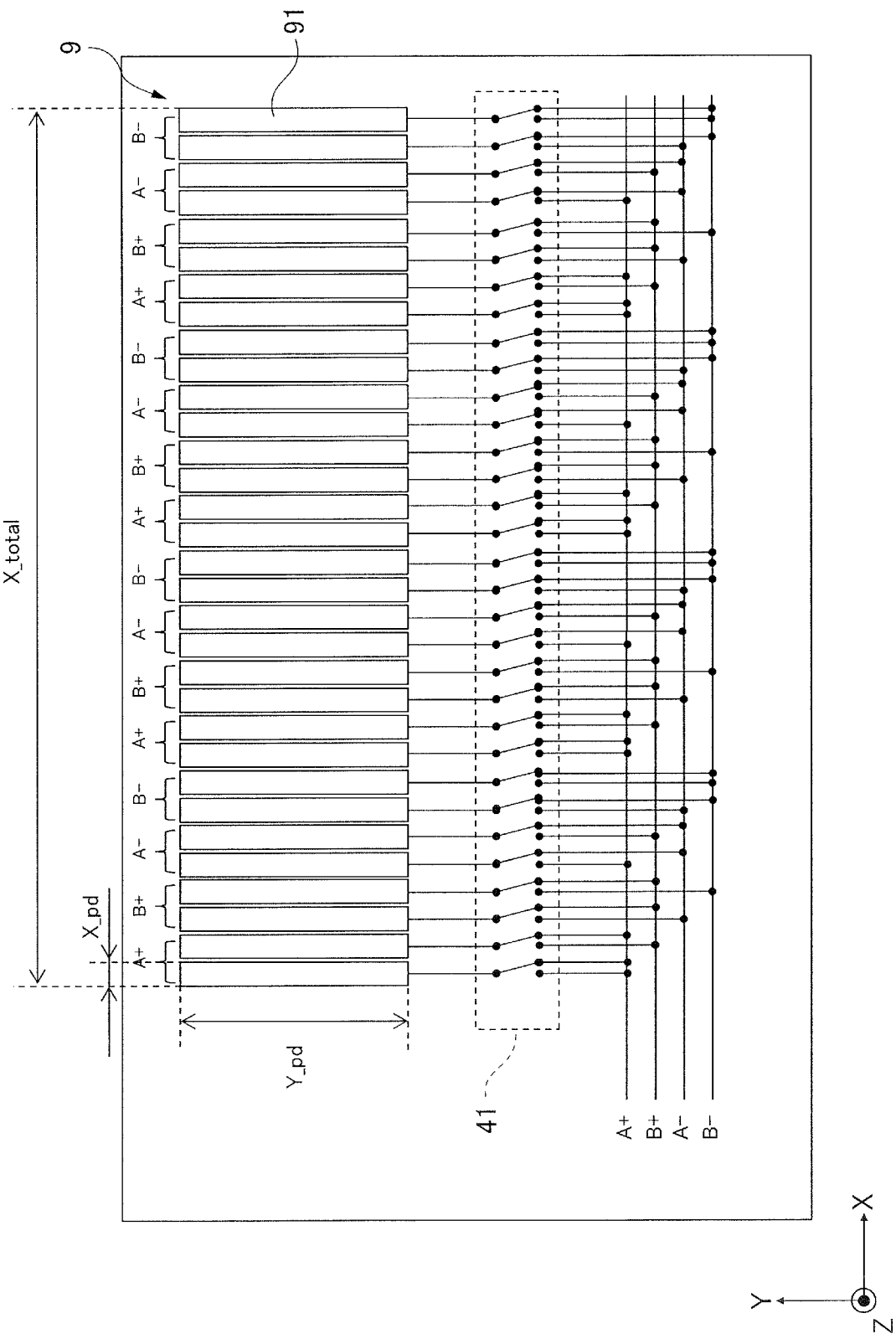
FIG. 4 is a plan view of the light receiving element array according to the first exemplary embodiment.

FIGS. 3 and 4 are each a plan view of the light receiving element array 9 according to the first exemplary embodiment. The light receiving element array 9 includes a plurality of light receiving elements 91, for example, 32 light receiving elements 91 arranged in parallel in the X direction. The plurality of light receiving elements 91 are arranged in the X direction at a pitch of, for example, 32 μm. Each light receiving element 91 has a length X_pd of, for example, 32 μm in the X direction, and a width Y_pd of, for example, 800 μm in the Y direction. The total length X_total of the light receiving element array 9 in the X direction is, for example, 1024 μm.

The light source 1 and the light receiving element array 9 are disposed such that the height of a light emitting surface of the light source 1 in the Z direction is at the same level as the height of a light receiving surface of the light receiving element array 9 in the Z direction. According to this positional relationship, the pattern elements on the scale portion 2 form a projected image doubled in size on the light receiving element array 9. Therefore, a radiation range of light radiated onto the scale portion 2 is set to 400 μm in the Y direction and 512 μm in the X direction such that the reflection light from the scale portion 2 is incident on the entirety of the light receiving element array 9. Reflection light from the track 11 and reflection light from the track 12 each form an interference fringe on the light receiving element array 9.

The signal processing circuit 51 illustrated in FIG. 1 includes a switch circuit 41 illustrated in FIGS. 3 and 4. The switch circuit 41 switches resolution of measured position information. The switch circuit 41 is constituted by a plurality of semiconductor switching elements. FIG. 3 illustrates a switching state of the switch circuit 41 in the case of measuring the position at a high resolution on the basis of the reflection light from the track 11. FIG. 4 illustrates a switching state of the switch circuit 41 in the case of measuring the position at a low resolution on the basis of the reflection light from the track 12. A periodic signal corresponding to the track 11 can be selectively obtained by switching the switch circuit 41 as illustrated in FIG. 3 so as to cause constructive interference of the periodic signal corresponding to the track 11 and destructive interference of the periodic signal corresponding to the track 12. A periodic signal corresponding to the track 12 can be selectively obtained by switching the switch circuit 41 as illustrated in FIG. 4 so as to cause constructive interference of the periodic signal corresponding to the track 12 and destructive interference of the periodic signal corresponding to the track 11.

Figure 5:
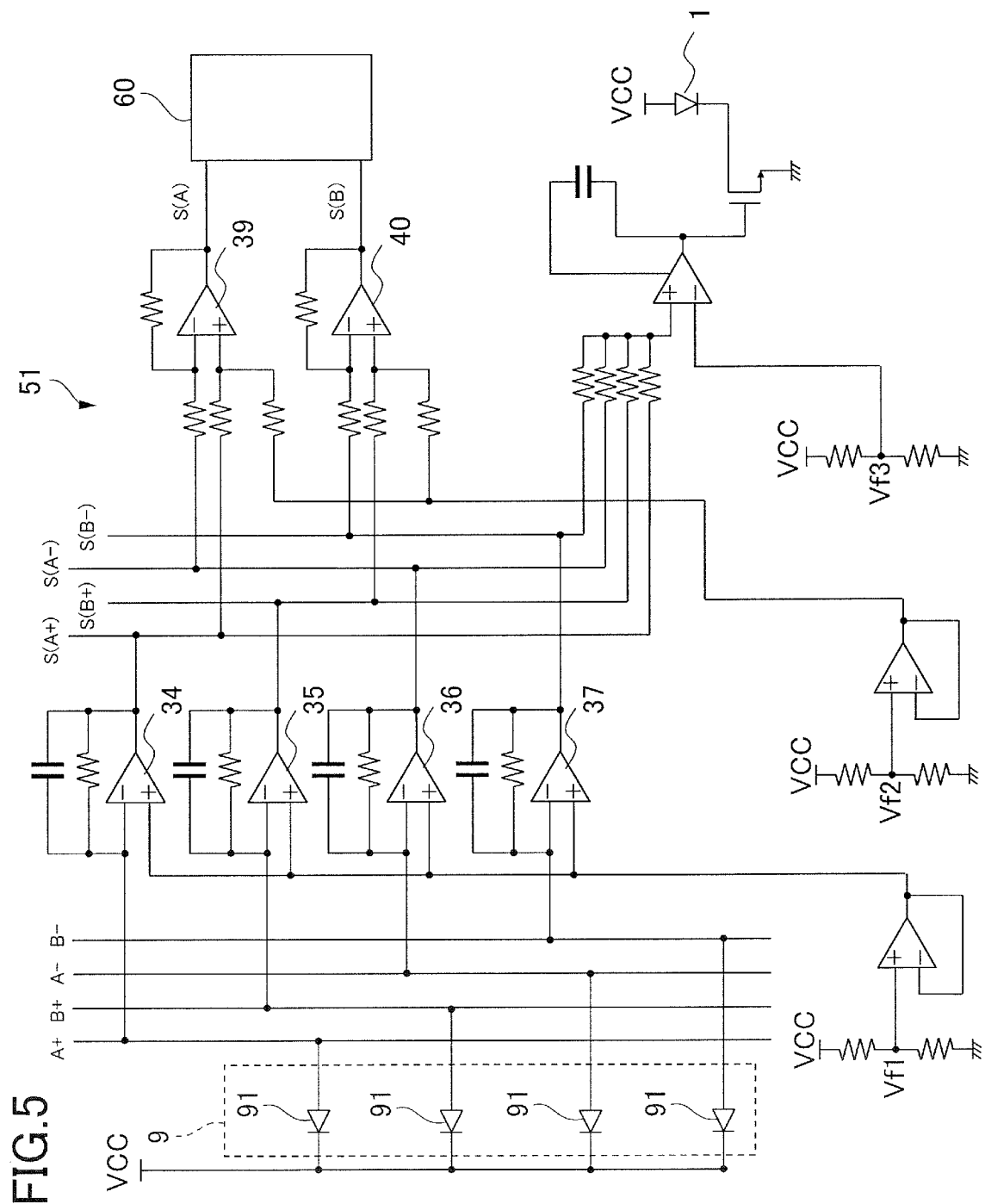
FIG. 5 is a circuit diagram of a signal processing circuit according to the first exemplary embodiment.

FIG. 5 is a circuit diagram of the signal processing circuit 51 according to the first exemplary embodiment. In FIG. 5, illustration of the switch circuit 41 is omitted, and only four of the light receiving elements 91 of the light receiving element array 9 connected to the signal processing circuit 51 are illustrated for the sake of convenience. The signal processing circuit 51 takes a connection state of FIG. 5 in either state of FIG. 3 or FIG. 4 of the switch circuit 41.

Four I-V conversion amplifiers 34, 35, 36, and 37 that are first stage amplifiers are provided at the following stage of the light receiving element array 9, that is, the following stage of the switch circuit 41. An A-phase differential amplifier 39 and a B-phase differential amplifier 40 are provided at the following stage of the I-V conversion amplifiers 34, 35, 36, and 37. An operation circuit 60 constituted by, for example, a microcomputer is provided at the following stage of the A-phase differential amplifier 39 and the B-phase differential amplifier 40. The switch circuit 41 is capable of switching how signals are loaded from the light receiving element array 9 by an input signal from the operation circuit 60.

In the case where the input signal is of a high level, the plurality of light receiving elements 91 illustrated in FIG. 3 are each electrically connected to corresponding one of the I-V conversion amplifiers 34, 35, 36, and 37. In this case, groups of light receiving elements 91, each group consisting of four light receiving elements 91 respectively corresponding to the I-V conversion amplifiers 34, 35, 36, and 37 in this order, are arranged in the X direction. Therefore, in the case where the pitch P1 is 64 μm, a measurement resolution is 128 μm, which is the period of a reflection image. In the case where the input signal is of a low level, the plurality of light receiving elements 91 illustrated in FIG. 4 are each electrically connected to corresponding one of the I-V conversion amplifiers 34, 35, 36, and 37. In this case, groups of light receiving elements 91, each group consisting of four pairs of light receiving elements 91, the four pairs respectively corresponding to the I-V conversion amplifiers 34, 35, 36, and 37 in this order, are arranged in the X direction. Therefore, in the case where the pitch P2 is 128 μm, the measurement resolution is 256 μm, which is the period of a reflection image. Since the pitch P1 is smaller than the pitch P2, the resolution is higher in the case of measuring the position on the basis of the track 11 than in the case of measuring the position on the basis of the track 12.

In the first exemplary embodiment, only the periodic signal from the track 11 can be obtained when the input signal to the switch circuit 41 is of the high level, and only the periodic signal from the track 12 can be obtained when the input signal to the switch circuit 41 is of the low level. According to such a configuration, the light receiving element array 9 does not have to be individually provided for each of the track 11 and the track 12, thus the number of components can be reduced, and the encoder 50 of a small size can be realized.

Current signals loaded from the respective light receiving elements 91 of the light receiving element array 9 are converted into sine wave voltage signals S(A+), S(B+), S(A−), and S(B−) of four phases by the I-V conversion amplifiers 34, 35, 36, and 37. The four phases will be referred to as a phase (A+), a phase (B+), a phase (A−), and a phase (B−), and the phase (A+) serves as a standard. The phase (B+) is about +90°, the phase (A−) is about +180°, and the phase (B−) is about +270° with respect to the phase (A+).

The sine wave voltage signals S(A+) and S(A−) of two phases are subjected to subtraction based on the following formula (1) by the A-phase differential amplifier 39. The sine wave voltage signals S(B+) and S(B−) of two phases are subjected to subtraction based on the following formula (2) by the B-phase differential amplifier 40.

$$S(A)=S(A+)-S(A-) \quad (1)$$

$$S(B)=S(B+)-S(B-) \quad (2)$$

As a result of this, an A-phase signal S(A) and a B-phase signal S(B) whose phase is shifted by 90° from the A-phase signal S(A) are generated in such a manner that a direct current component has been removed from each of the A-phase signal S(A) and the B-phase signal S(B).

The phase Φ of the A-phase signal S(A) and the B-phase signal S(B) changes in accordance with the position of the scale portion 2. For example, when the scale portion 2 translates in the X direction by an amount of one pitch, the phase Φ changes from 0 to 2π. The phase Φ of the A-phase signal S(A) and the B-phase signal S(B) can be calculated by using the following formula (3).

$$\Phi=\mathrm{ATAN2}[S(A),S(B)] \quad (3)$$

ATAN 2[X,Y] is a function of calculating arctangent of converting a signal into a phase of 0 to 2π by judging the quadrant, which is used in, for example, the C programming language. An amount of movement equal to or smaller than one pitch of the scale portion 2 can be obtained by calculating the phase Φ. Therefore, the resolution increases when the pitch becomes smaller.

Figure 6:
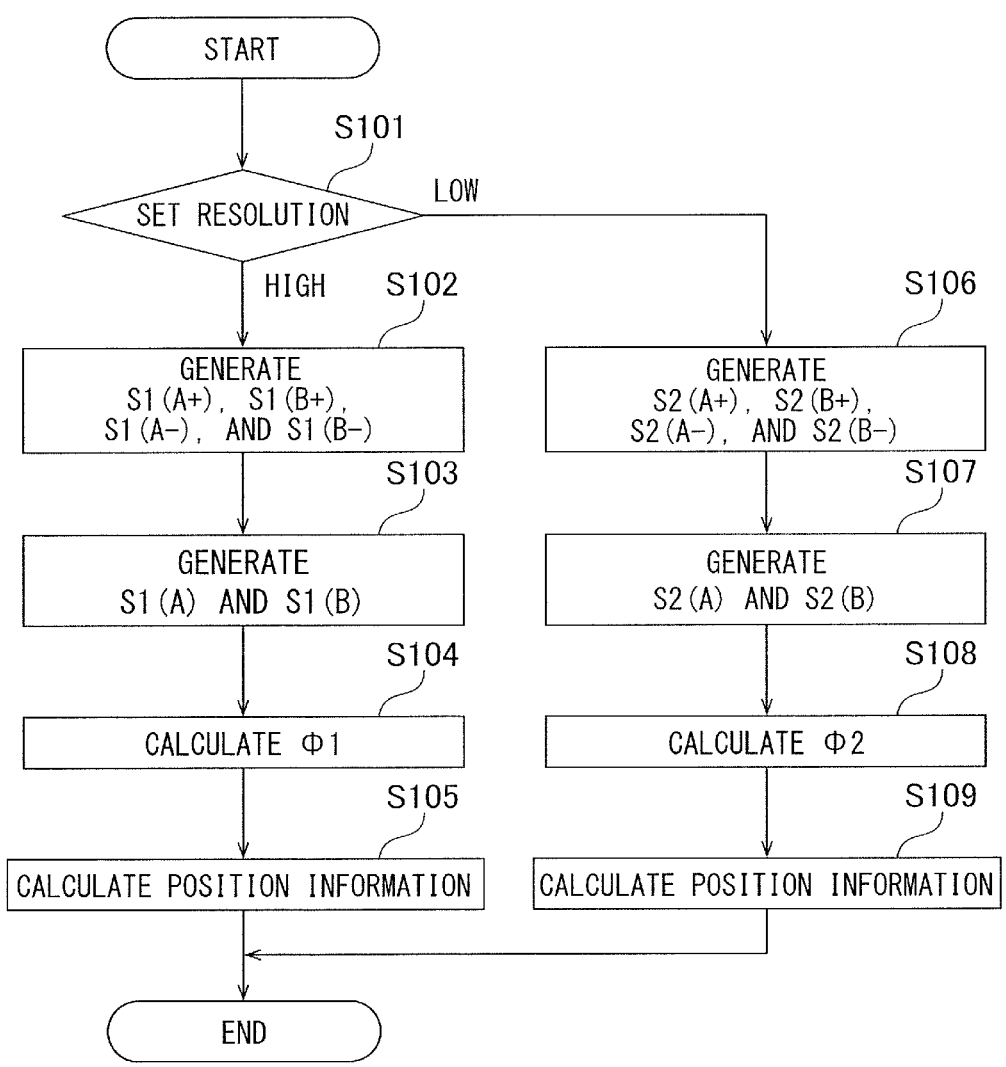
FIG. 6 is a flowchart according to the first exemplary embodiment.

FIG. 6 is a flowchart illustrating each step of a method of obtaining relative position information of the scale portion 2 with respect to the head 7 according to the first exemplary embodiment.

The operation circuit 60 sets a resolution of measuring the position in step S101. Specifically, the operation circuit 60 transmits an input signal of a high level or a low level to the switch circuit 41.

A case of obtaining the position information at a high resolution will be described. The operation circuit 60 transmits an input signal of a high level to the switch circuit 41, and a switching state illustrated in FIG. 3 is taken by a switching operation of the switch circuit 41. In this switching state, signals output from the light receiving element array 9 are converted into sine wave voltage signals S1(A+), S1(B+), S1(A−), and S1(B−) of four phases by the I-V conversion amplifiers 34, 35, 36, and 37. That is, the I-V conversion amplifiers 34, 35, 36, and 37 generate the sine wave voltage signals S1(A+), S1(B+), S1(A−), and S1(B−) of four phases in step S102 on the basis of photoelectric currents obtained from the light receiving element array 9.

The sine wave voltage signals S1(A+), S1(B+), S1(A−), and S1(B−) are subjected to subtraction based on the formulae (1) and (2) in the A-phase differential amplifier 39 and the B-phase differential amplifier 40. That is, the A-phase differential amplifier 39 and the B-phase differential amplifier 40 generate an A-phase signal S1(A) and a B-phase signal S1(B) together serving as a first signal corresponding to the track 11 in step S103.

The operation circuit 60 calculates a phase Φ1 of the A-phase signal S1(A) and the B-phase signal S1(B) by using the formula (3) in step S104.

In step S105, the operation circuit 60 counts the wavenumber of the A-phase signal S1(A) or the B-phase signal S1(B), and further obtains relative position information of the scale portion 2, that is, of the movable portion to which the scale portion 2 is fixed, by interpolation calculation using the formula (3). As described above, by switching to the state of FIG. 3 by the switch circuit 41, the position information of the scale portion 2 can be obtained at a high resolution by using the track 11.

In the case of obtaining the relative position information of the scale portion 2 at a low resolution, the operation circuit 60 transmits an input signal of a low level to the switch circuit 41 to take the switching state of FIG. 4 by a switching operation of the switch circuit 41. In this switching state, signals output from the light receiving element array 9 are converted into sine wave voltage signals S2(A+), S2(B+), S2(A−), and S2(B−) of four phases by the I-V conversion amplifiers 34, 35, 36, and 37. That is, the I-V conversion amplifiers 34, 35, 36, and 37 generate the sine wave voltage signals S2(A+), S2(B+), S2(A−), and S2(B−) of four phases in step S106 on the basis of photoelectric currents obtained from the light receiving element array 9.

The sine wave voltage signals S2(A+), S2(B+), S2(A−), and S2(B−) are subjected to subtraction based on the formulae (1) and (2) in the A-phase differential amplifier 39 and the B-phase differential amplifier 40. That is, the A-phase differential amplifier 39 and the B-phase differential amplifier 40 generate an A-phase signal S2(A) and a B-phase signal S2(B) together serving as a second signal corresponding to the track 12 in step S107.

The operation circuit 60 calculates a phase Φ2 of the A-phase signal S2(A) and the B-phase signal S2(B) by using the formula (3) in step S108.

In step S109, the operation circuit 60 counts the wavenumber of the A-phase signal S2(A) or the B-phase signal S2(B), and further obtains relative position information of the scale portion 2, that is, of the movable portion to which the scale portion 2 is fixed, by interpolation calculation using the formula (3). As described above, by switching to the state of FIG. 4 by the switch circuit 41, the position information of the scale portion 2 can be obtained at a low resolution by using the track 12.

In the first exemplary embodiment, the signal processing circuit 51 obtains the position information of the scale portion 2 by selectively using the A-phase signal S1(A) and the B-phase signal S1(B) or the A-phase signal S2(A) and the B-phase signal S2(B) as described above. Although a case of selecting the measurement resolution of the position information has been described above, the configuration is not limited to this. For example, a configuration in which measurement is performed only at one measurement resolution and measurement at the other measurement resolution is not performed may be employed. That is, in the flowchart of FIG. 6, steps S101 to S105 may be omitted, or steps S101 and S106 to S109 may be omitted. If a high resolution is required, steps S101 and S106 to S109 may be omitted and steps S102 to S105 may be performed.

Figure 7:
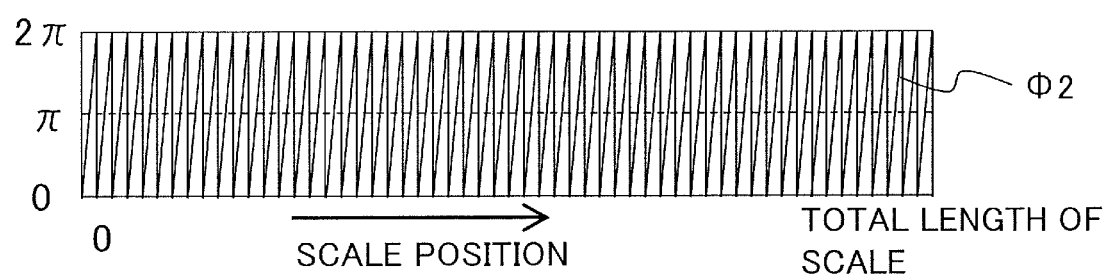
FIG. 7 is a graph illustrating a relationship between a signal phase and a scale position in the first exemplary embodiment.

FIG. 7 is a graph illustrating a relationship between the signal phase Φ2 and the position of the scale portion 2, that is, a scale position. As illustrated in FIG. 7, the phase Φ2 changes in a sawtooth wave shape in accordance with the position of the scale portion 2. In the first exemplary embodiment, the relative position of the scale portion 2 can be obtained with a high precision by interpolation calculation.

Next, a case of measuring a gap between the light source 1 and the scale portion 2 in the Z direction by using both of the A-phase signal S1(A) and the B-phase signal S1(B) together serving as the first signal and the A-phase signal S2(A) and the B-phase signal S2(B) together serving as the second signal will be described.

Figure 8:
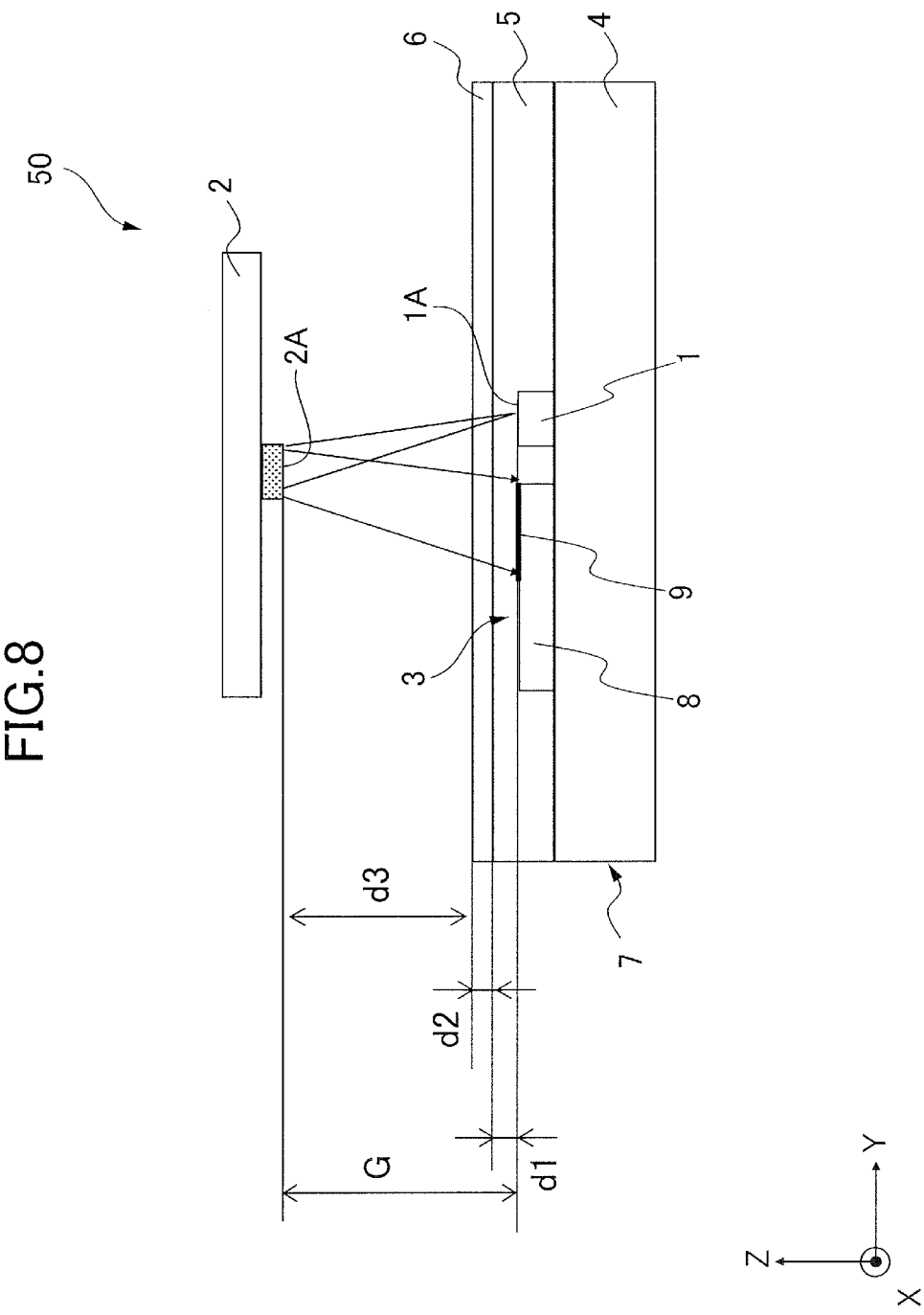
FIG. 8 is a diagram illustrating an encoder according to the first exemplary embodiment.

FIG. 8 illustrates the encoder 50 according to the first exemplary embodiment. An actual physical distance may be obtained as a gap G in the Z direction between a light emitting surface 1A of the light source 1 and a reflection surface 2A of the scale portion 2. However, in the first exemplary embodiment, since layers having refractive indices different from that of an air layer, such as the resin 5 and the glass 6, are present between the light source 1 and the scale portion 2, an optical distance is obtained.

In the actual distance in the Z direction between the light source 1 and the scale portion 2, an actual distance in the Z direction corresponding to the resin 5 is expressed by d1, an actual distance in the Z direction corresponding to the glass 6 is expressed by d2, and an actual distance in the Z direction corresponding to an air layer is expressed by d3. In addition, the refractive index of the resin 5 is expressed by n1, the refractive index of the glass 6 is expressed by n2, and the refractive index of the air layer is expressed by n3, which is 1. In this definition, the optical distance in the Z direction between a light emitting surface 1A of the light source 1 and a reflection surface 2A of the scale portion 2 is d1/n1+d2/n2+d3/n3. The actual distances d1 and d2 and the refractive indices n1, n2, and n3 do not change. Therefore, the optical distance in the Z direction between the light emitting surface 1A of the light source 1 and the reflection surface 2A of the scale portion 2 changes in accordance with the actual distance d3. Therefore, the actual distance d3 may be obtained after obtaining the optical distance as the gap G.

Figure 9:
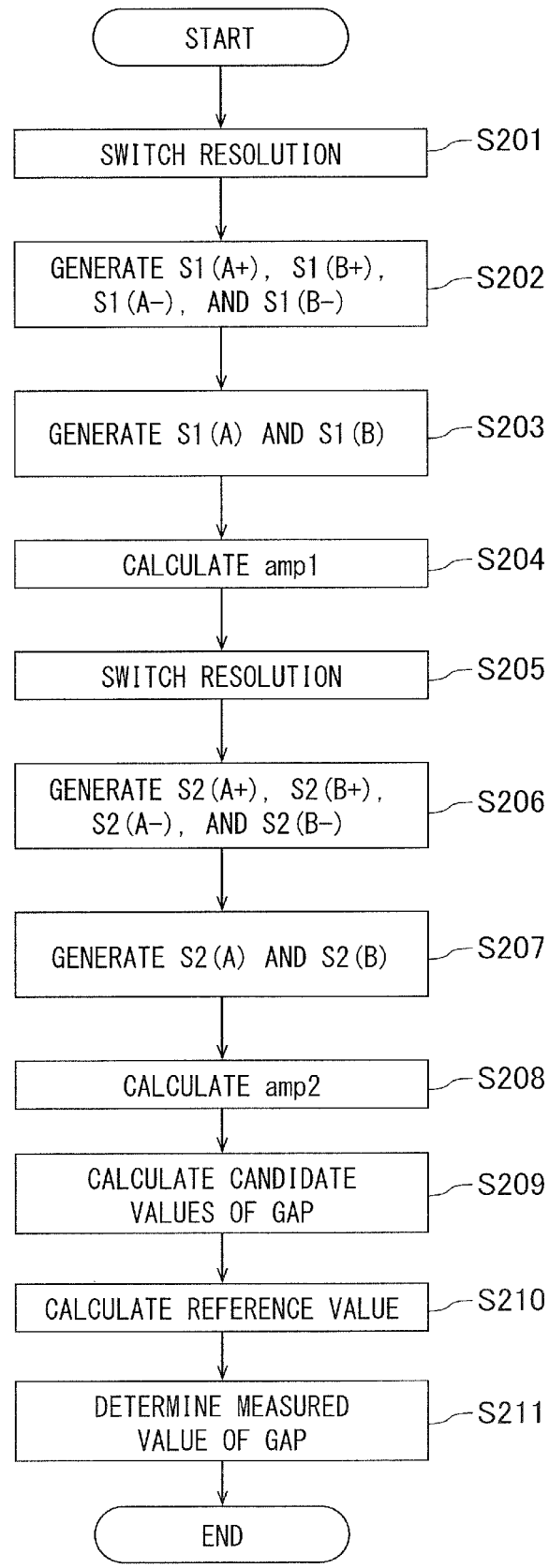
FIG. 9 is a flowchart according to the first exemplary embodiment.

FIG. 9 is a flowchart illustrating each step of a gap measuring method according to the first exemplary embodiment. In the present exemplary embodiment, the gap G is measured on the basis of signal amplitudes obtained at a plurality of resolutions. This measurement is performed by switching the switch circuit 41 between the state of FIG. 3 and the state of FIG. 4.

First, the encoder apparatus 500 illustrated in FIG. 1 is prepared. In step S201, the operation circuit 60 illustrated in FIG. 5 transmits an input signal of a high level to the switch circuit 41, and thus the switching state illustrated in FIG. 3 is taken by the switching operation of the switch circuit 41. In this switching state, the I-V conversion amplifiers 34, 35, 36, and 37 generate the sine wave voltage signals S1(A+), S1(B+), S1(A−), and S1(B−) of four phases in step S202 on the basis of photoelectric currents obtained from the light receiving element array 9.

The A-phase differential amplifier 39 and the B-phase differential amplifier 40 generate the A-phase signal S1(A) and the B-phase signal S1(B) together serving as the first signal corresponding to the track 11 by subtraction processing based on the formulae (1) and (2) in step S203.

Phases of the A-phase signal S1(A) and the B-phase signal S1(B) are different from each other by 90°. The operation circuit 60 obtains an amplitude amp1 of the first signal by the following formula (4) in step S204.

$$\mathrm{amp1}=\mathrm{SQRT}[S1(A)^2+S1(B)^2] \quad (4)$$

That is, the operation circuit 60 calculates an average amplitude of the A-phase signal S1(A) and the B-phase signal S1(B), more specifically, a root sum square of the A-phase signal S1(A) and the B-phase signal S1(B). SQRT [X] is a function of calculating the root of X.

To be noted, the amplitude of the A-phase signal S1(A) or the B-phase signal S1(B) may be obtained as the amplitude amp1 by monitoring the A-phase signal S1(A) or the B-phase signal S1(B) while relatively moving the scale portion 2 with respect to the head 7.

The operation circuit 60 transmits an input signal of a low level to the switch circuit 41 to take the switching state of FIG. 4 by a switching operation of the switch circuit 41 in step S205. In this switching state, the I-V conversion amplifiers 34, 35, 36, and 37 generate the sine wave voltage signals S2(A+), S2(B+), S2(A−), and S2(B−) of four phases in step S206 on the basis of photoelectric currents obtained from the light receiving element array 9.

The A-phase differential amplifier 39 and the B-phase differential amplifier 40 generate the A-phase signal S2(A) and the B-phase signal S2(B) together serving as the second signal corresponding to the track 12 by subtraction processing based on the formulae (1) and (2) in step S207.

Phases of the A-phase signal S2(A) and the B-phase signal S2(B) are different from each other by 90°. The operation circuit 60 obtains an amplitude amp2 of the second signal by the following formula (5) in step S208.

$$\mathrm{amp2}=\mathrm{SQRT}[S2(A)^2+S2(B)^2] \quad (5)$$

That is, the operation circuit 60 calculates an average amplitude of the A-phase signal S2(A) and the B-phase signal S2(B), more specifically, a root sum square of the A-phase signal S2(A) and the B-phase signal S2(B).

To be noted, the amplitude of the A-phase signal S2(A) or the B-phase signal S2(B) may be obtained as the amplitude amp2 by monitoring the A-phase signal S2(A) or the B-phase signal S2(B) while relatively moving the scale portion 2 with respect to the head 7.

As described above, the signal processing circuit 51 receives signals of receiving the light reflected on the track 11 and signals of receiving the light reflected on the track 12 from the light receiving element array 9 with a time difference therebetween by switching how signals are loaded from the light receiving element array 9. Then, the signal processing circuit 51 generates the A-phase signal S1(A) and the B-phase signal S1(B) as the first signal from the signals of receiving the light reflected on the track 11. In addition, the signal processing circuit 51 generates the A-phase signal S2(A) and the B-phase signal S2(B) as the second signal from the signals of receiving the light reflected on the track 12. Then, the signal processing circuit 51 obtains the signal amplitude amp1 from the A-phase signal S1(A) and the B-phase signal S1(B), and the signal amplitude amp2 from the A-phase signal S2(A) and the B-phase signal S2(B).

Here, the signal amplitudes amp1 and amp2 change with respect to the gap G at a period expressed by the following formula (6).

$$2 \times P^2/\lambda \quad (6)$$

P corresponds to the pitch P1 or P2, and λ represents the wavelength of light emitted from the light source 1. For example, in the case where P1 is 64 μm and k is 650 nm, the period of change of the signal amplitude calculated by the formula (6) in consideration of the phase is about 12.60 mm. In addition, for example, in the case where P2 is 128 μm and λ is 650 nm, the period of change of the signal amplitude calculated by the formula (6) in consideration of the phase is about 50.41 mm.

Considering the formula (6), the signal amplitude amp corresponding to the gap G is expressed by the following formula (7). The signal amplitude amp is amp1 when P is P1 and is amp2 when P is P2.

$$\mathrm{amp}=\cos(2\pi \times G/(2 \times P^2/\lambda)) \quad (7)$$

The gap G can be obtained by the following formula (8)

$$G = (2 \times P^2/\lambda)/2\pi \times \arccos(\text{amp}) \quad (8)$$

Figure 10:
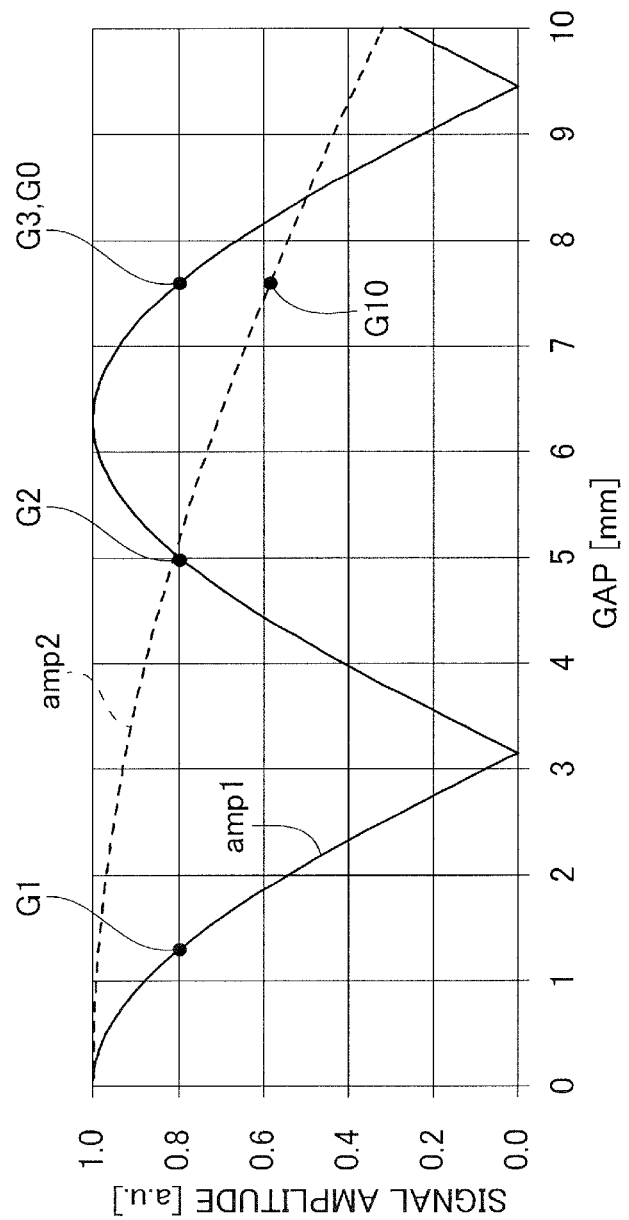
FIG. 10 is a graph illustrating a relationship between a gap and a signal amplitude in the first exemplary embodiment.

FIG. 10 is a graph illustrating a relationship between the gap and the signal amplitude in the case where P1 is 64 μm, P2 is 128 μm, and λ is 650 nm. In FIG. 10, the vertical axis represents the signal amplitude and the horizontal axis represents the gap. In FIG. 10, the signal amplitude amp1 in the case where P1 is 64 μm and λ is 650 nm is indicated by a solid line, and the signal amplitude amp2 in the case where P2 is 128 μm and λ is 650 nm is indicated by a broken line. In addition, in FIG. 10, the signal amplitudes amp1 and amp2 are illustrated such that the signal amplitudes amp1 and amp2 for the respective pitches P1 and P2 at the gap G of 0 are standardized to 1. Description will be given assuming that a desired measurement range of the gap G in the first exemplary embodiment is 0 mm to 10 mm.

The signal amplitudes amp1 and amp2 periodically change as absolute values of sine waves, more specifically cosine waves, with respect to the gap G as illustrated in FIG. 10. Although the formula (7) can represent both positive and negative values in theory, since the formula (7) is a formula of light interference including phase information, the actual signal amplitude can only be a positive value, and thus the graph thereof is as illustrated in FIG. 10. The signal amplitude amp1 decreases as the gap G increases from 0, and reaches 0 at the gap G of about 3.15 mm. The signal amplitude amp1 starts increasing at the gap G of about 3.15 mm, increases as the gap G increases, and reaches 1 at the gap G of about 6.30 mm. The signal amplitude amp1 starts decreasing at the gap G of about 6.30 mm. That is, the signal amplitude amp1 changes at a period of about 6.30 mm serving as a first period with respect to the change of the gap G.

In the first exemplary embodiment, the measurement range of the gap G is set to the range of 0 mm to 10 mm such that the measurement range includes a range wider than about 3.15 mm, which is a half of the first period, which is about 6.30 mm. By using the track 11, the gap G can be measured with a high precision. However, in the measurement range of the gap G, which is 0 mm to 10 mm, a plurality of values, for example, two, three, or four values are calculated as candidate values in the example of FIG. 10, and a single value cannot be obtained. Therefore, if it is attempted to obtain the gap G with a high precision by only using the track 11, the measurable range of the gap G will be 0 mm to about 3.15 mm, which is narrow.

In step S209, the operation circuit 60 obtains a plurality of candidate values of the gap G on the basis of the amplitude amp1 of the first signal obtained as a result of the light receiving element array 9 receiving the light reflected on the track 11. Specifically, the operation circuit 60 obtains the plurality of candidate values in a desired measurement range by using the formula (8) serving as a predetermined formula. In the example of FIG. 10, for example, in the case where the signal amplitude amp1 is 0.8, a plurality of candidate values G1, G2, and G3 are obtained in the measurement range of 0 mm to 10 mm.

Meanwhile, the signal amplitude amp2 decreases as the gap G increases from 0, and, although illustration thereof is omitted, the signal amplitude amp2 reaches 0 at the gap G of about 12.60 mm. The signal amplitude amp2 starts increasing at the gap G of about 12.60 mm, increases as the gap G increases, and reaches 1 at the gap G of about 25.20 mm. The signal amplitude amp2 starts decreasing at the gap G of about 25.20 mm. That is, the signal amplitude amp2 changes at a period of about 25.20 mm serving as a second period, which is longer than about 6.30 mm serving as the first period, with respect to the change of the gap G.

The measurement range of the gap G is set to the range of 0 mm to 10 mm such that the measurement range includes a range equal to or wider than a half of about 6.30 mm serving as the first period and is equal to or narrower than a half of about 25.20 mm serving as the second period, that is, equal to or narrower than about 12.60 mm. By using the track 12, a single value of the gap G can be measured in a desired measurement range of the gap G, which is 0 mm to 10 mm. However, due to a low sensitivity thereof, the single value of the gap G is used as a reference value in the first exemplary embodiment.

In step S210, the operation circuit 60 obtains the reference value of the gap G on the basis of the amplitude amp2 of the second signal obtained as a result of the light receiving element array 9 receiving the light reflected on the track 12. Specifically, the operation circuit 60 obtains the reference value by using the formula (8). That is, a value of the gap G obtained on the basis of the track 12 is used as the reference value. In the example of FIG. 10, for example, in the case where the signal amplitude amp2 is 0.58, a reference value G10 is obtained.

Next, in step S211, the operation circuit 60 compares the plurality of candidate values G1, G2, and G3 with the reference value G10, and determines a measured value G0 that is a measurement result of the gap G. More specifically, the operation circuit 60 determines the candidate value G3 that is the closest to the reference value G10 among the plurality of candidate values G1, G2, and G3 as the measured value G0. To be noted, although a case of determining the reference value G10 from the signal amplitude amp2 has been described, the measured value G0 may be directly determined from the candidate values G1, G2, and G3 by using the signal amplitude amp2.

As described above, the operation circuit 60 determines the measured value G0 from among the plurality of candidate values G1, G2, and G3 on the basis of the signal amplitude amp2 in steps S210 and S211. According to this, the gap G can be measured with a high precision, and the measurement range of the gap G can be widened.

To be noted, the graph illustrated in FIG. 10 corresponds to a case where the light radiated from the light source 1 onto the scale portion 2 is constant regardless of the gap such as parallel light, that is, a case where the amount of light received on the light receiving element array 9 does not attenuate even when the gap is widened. However, application of the present invention is not limited to this. For example, the present invention can be also applied to a case where the light emitted from the light source 1 is divergent light and the amount of light received on the light receiving element array 9 attenuates as the gap is widened.

In addition, although a case of obtaining the candidate values and the reference value by using the formula (8) has been described, a predetermined table indicating the relationship of FIG. 10 may be stored in the storage device 52. In this case, the operation circuit 60 can obtain the candidate values corresponding to the signal amplitude amp1 and the reference value corresponding to the signal amplitude amp2 by using the predetermined table stored in the storage device 52.

In addition, although a case where the light source wavelength is 650 nm, the pitch P1 of the track 11 is 64 μm, and the pitch P2 of the track 12 is 128 μm has been described as an example, the values are not limited to these values. The respective pitches P1 and P2 may be any pitches as long as the pitches are different from each other and fine and have a gap measurement sensitivity that is high enough to recognize the signal amplitude variation with respect to the gap variation and is approximately not 0.

Second Exemplary Embodiment

Next, an encoder apparatus of a second exemplary embodiment will be described. Although a case where the encoder is an optical incremental encoder has been described in the first exemplary embodiment, a case where the encoder is an optical absolute encoder will be described in the second exemplary embodiment. The configuration of the encoder of the second exemplary embodiment is similar to the configuration of the encoder described in the first exemplary embodiment, and thus detailed description thereof will be omitted.

Although a case of measuring a relative value of position information has been described in the first exemplary embodiment because the encoder is an incremental encoder, in the second exemplary embodiment, since the encoder is an absolute encoder, a case of measuring an absolute value of the position information by, for example, using Vernier calculation will be described. The Veinier calculation is a method of obtaining a periodic signal having a period different from original periods of the at least two pitches illustrated in FIG. 2B by calculating a phase difference between the pitches P1 and P2.

A method of measuring the position information of the scale portion 2 will be described below. The description will be given by taking as an example a case where the pitch P1 of the track 11 is 64.249 μm and the pitch P2 of the track 12 is 128 μm, which leads to a pitch ratio between the two tracks 11 and 12 slightly deviated from an integer.

In the case where the measurement resolution of the light receiving element array 9 is 128 μm, in the signal obtained from the track 12, the measurement resolution of the light receiving element array 9, which is 128 μm, is equal to the period of the pattern elements of the track 12, which is also 128 μm. Therefore, the phase Φ2 is obtained from the A-phase signal S2(A) and the B-phase signal S2(B) in a similar manner to the first exemplary embodiment.

In the case where the measurement resolution of the light receiving element array 9 is 64 μm, in the signal obtained from the track 11, the period of the pattern elements of the track 11, which is 64.249 μm, is slightly deviated from the measurement resolution of the light receiving element array 9, which is 64 μm. Therefore, relative phase difference correction processing is preferably performed between sine wave-like signals S1(A)' and S1(B)' of two phases. A method of phase difference correction will be described below.

The sine wave signals S1(A)' and S1(B)' of two phases including a relative phase difference error e are respectively represented by the following formulae (9) and (10), in which the phase is represented by θ.

$$S1(A)'=\cos(\theta+e/2) \quad (9)$$

$$S1(B)'=\sin(\theta-e/2) \quad (10)$$

The error e can be separated as indicated by the following formulae (11) and (12) by adding and subtracting the sine wave signals S1(A)' and S1(B)' of two phases represented by the formulae (9) and (10).

$$S1(A)'+S1(B)'=2\times\cos(\theta-\pi/4)\sin(e/2-\pi/4) \quad (11)$$

$$-S1(A)'+S1(B)'=2\times\sin(\theta-\pi/4)\cos(e/2-\pi/4) \quad (12)$$

The relative phase difference error e can be expressed by $e=(1-64/64.249)\times\pi$ in consideration of design values.

By multiplying the respective amplitude components $2\times\sin(e/2-\pi/4)$ and $2\times\cos(e/2-\pi/4)$ of the formulae (11) and (12) by inverse numbers thereof, the sine wave signals S1(A) and S1(B) of two phases represented by the following formulae (13) and (14) in which the phase difference error is corrected can be calculated. Herein, φ is θ−π/4.

$$S1(A)=(S1(A)'+S1(B)')/(2\times\sin(e/2-\pi/4))=\cos\varphi \quad (13)$$

$$S1(B)=(-S1(A)'+S1(B)')/(2\times\cos(e/2-\pi/4))=\sin\varphi \quad (14)$$

To be noted, the relative phase difference error e may be stored in the storage device 52 illustrated in FIG. 1 in an initialization operation. For example, the amplitude component $2\times\sin(e/2-\pi/4)$ is obtained from (maximum value−minimum value)/2 of S1(A)'+S1(B)' in a predetermined range in the X direction. In addition, the amplitude component $2\times\cos(e/2-\pi/4)$ may be obtained from (maximum value−minimum value)/2 of −S1(A)'+S1(B)' and stored in the storage device 52. In this case, even when there is a difference between mounted heights of the light source 1 and the light receiving element array 9 and an error of image magnification derived from relative inclination of the light source 1 and the scale portion 2, correction can be performed also for the influence of these errors. To be noted, it is preferable that an offset error and an error of a gain ratio included in the signals S1(A) and S1(B) caused by the offset and gain variation of each amplifier are corrected.

On the basis of both of the A-phase signal S1(A) and the B-phase signal S1(B) obtained as described above and the A-phase signal S2(A) and the B-phase signal S2(B), the following calculation is performed to measure the absolute position of the scale portion 2, that is, of the movable portion to which the scale portion 2 is fixed.

First, the phase φ1 and the amplitude amp1 are obtained, by using the following formulae (15) and (16), from the A-phase signal S1(A) and the B-phase signal S1(B) in the case where the input signal to the switch circuit 41 illustrated in FIG. 3 is of a high level and the measurement resolution of the light receiving element array 9 is 64 μm.

$$\Phi1=\text{ATAN2}[S1(A),S1(B)] \quad (15)$$

$$\text{amp1}=\text{SQRT}[S1(A)^2+S1(B)^2] \quad (16)$$

Here, ATAN 2[Y, X] is an arctangent calculation function of converting a signal into a phase of ±π by judging the quadrant, and SQRT[X] is a function of calculating a root.

Similarly, the phase Φ2 and the amplitude amp2 are obtained, by using the following formulae (17) and (18), from the A-phase signal S2(A) and the B-phase signal S2(B) in the case where the input signal to the switch circuit 41 illustrated in FIG. 4 is of a low level and the measurement resolution of the light receiving element array 9 is 128 μm.

$$\Phi2=\text{ATAN2}[S2(A),S2(B)] \quad (17)$$

$$\text{amp2}=\text{SQRT}[S2(A)^2+S2(B)^2] \quad (18)$$

Further, a Vernier signal Sv is obtained by the following formula (19).

$$Sv=2\times\Phi2-\Phi1 \quad (19)$$

Here, calculation of Sv=Sv+2π when Sv<0 and Sv=Sv−2π when Sv>2π is repeatedly performed, and thus the output range of the Vernier signal Sv is converted into a range of 0 to 2π.

Figure 11A:
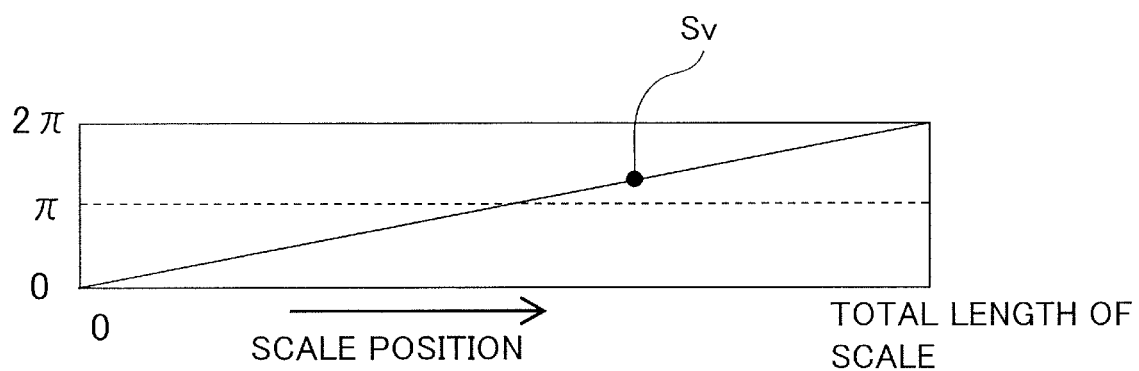
FIG. 11A is a graph illustrating a relationship between a Vernier signal and a scale position in a second exemplary embodiment.

FIG. 11A is a graph illustrating a relationship between the Vernier signal Sv and the scale position. The Vernier signal Sv is a periodic signal having a period of 16.512 mm, and a total scale length of 16.512 mm corresponds to one period of the Vernier signal Sv.

Figure 11B:
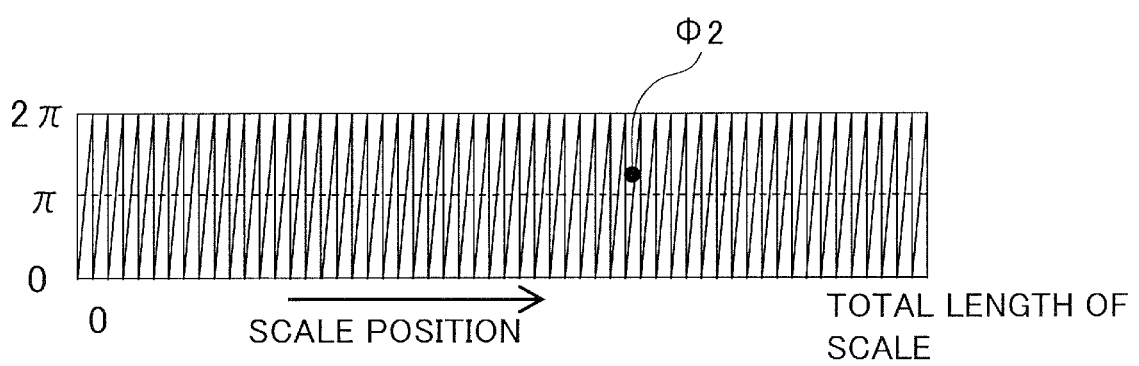
FIG. 11B is a graph illustrating a relationship between a signal phase and a scale position in the second exemplary embodiment.

FIG. 11B is a graph illustrating a relationship between the signal phase Φ2 and the scale position. The phase Φ2 is a periodic signal having a period of 128 µm, and the total scale length of 16.512 mm corresponds to 129 periods of the phase Φ2.

By synchronizing the Vernier signal Sv obtained by the formula (19) and the phase Φ2 obtained by the formula (17), the absolute value of the position information can be obtained. That is, the signal processing circuit 51 obtains the position information of the scale portion 2 by using both of the A-phase signal S1(A) and the B-phase signal S1(B) and the A-phase signal S2(A) and the B-phase signal S2(B). To be noted, the absolute value of the position information may be obtained by synchronizing the Vernier signal Sv obtained by the formula (19) with the phase Φ1 obtained by the formula (15).

The measurement method of the gap in the second exemplary embodiment is similar to the measurement method of the gap in the first exemplary embodiment. In the second exemplary embodiment, the pitch P1 is set to 64.249 µm, the pitch p2 is set to 128 µm, and the signal amplitudes amp1 and amp2 can be obtained by respectively reading the track 11 of the pitch P1 and the track 12 of the pitch P2 by using the head 7. Then, the measured value G0 of the gap G can be calculated by performing comparison in a similar manner to the first exemplary embodiment.

As described above, the gap G can be measured with a high precision also with an optical absolute encoder that measures the absolute value of the position information, and the measurement range of the gap G can be widened. In addition, according to the second exemplary embodiment, gap measurement can be performed by using the plurality of tracks 11 and 12 for measuring the absolute value of the position information, and thus a scale dedicated for gap measurement does not have to be provided.

To be noted, although a case of obtaining the absolute value of the position information by using Vernier calculation has been described, the configuration is not limited to this as long as the absolute value of the position information is obtained by using information obtained from a plurality of tracks.

In addition, although a case where the light source wavelength is 650 nm, the pitch P1 of the track 11 is 64.249 µm, and the pitch P2 of the track 12 is 128 µm has been described as an example, the values are not limited to these values. The respective pitches P1 and P2 may be any pitches as long as the pitches are different from each other and fine and have a gap measurement sensitivity high enough to recognize the signal amplitude variation with respect to the gap variation and is approximately not 0.

The first and second exemplary embodiments have been described for a case where the present invention is applied to a linear encoder. However, the present invention can be also applied to a rotary encoder. In the case of the rotary encoder, the scale portion 2 relatively rotates with respect to the head 7. In this case, the respective pitches P1 and P2 of the tracks 11 and 12 of the scale portion 2 are angles with respect to the rotation center of the scale portion 2.

Third Exemplary Embodiment

Figure 12:
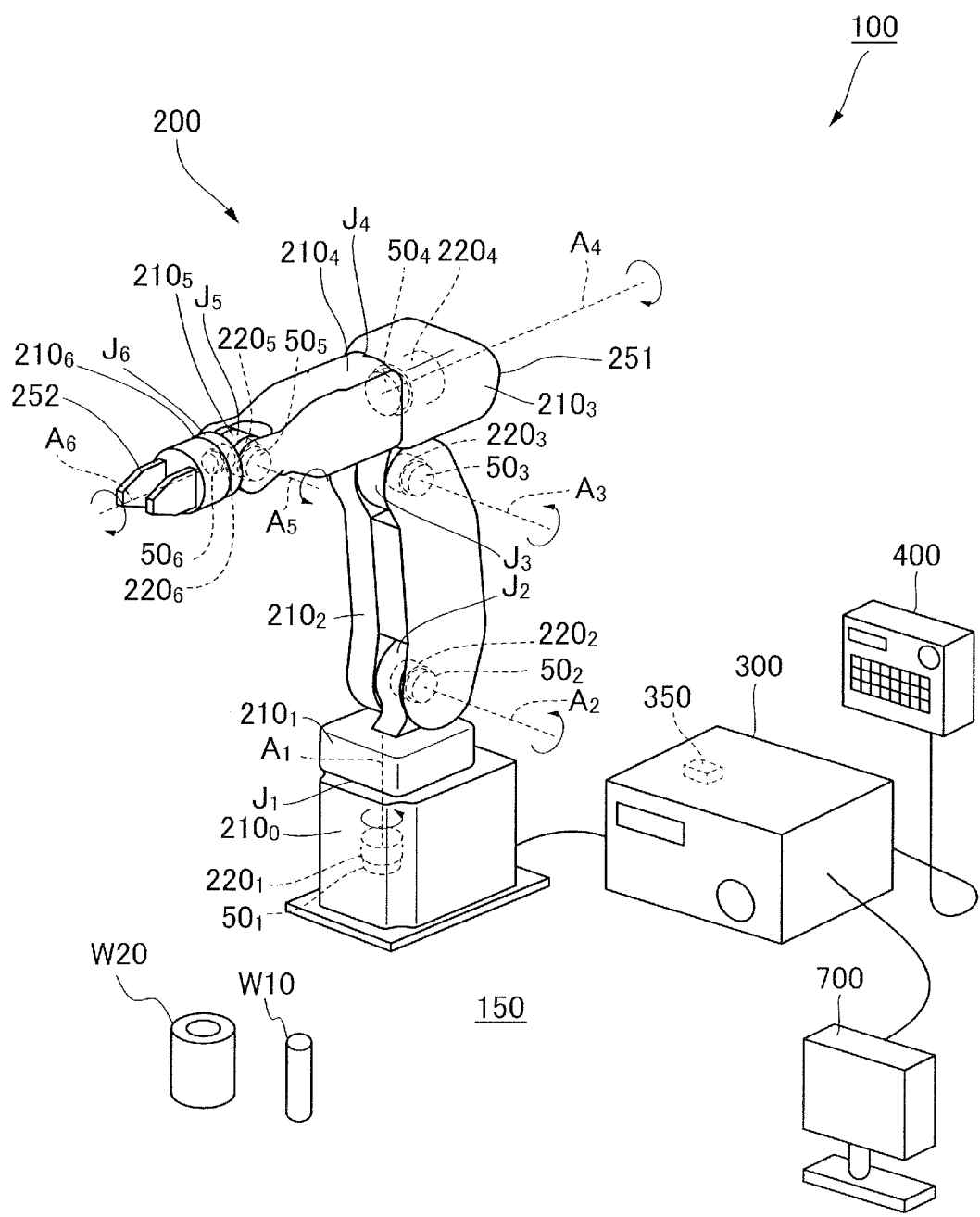
FIG. 12 is a perspective view of a robot apparatus according to a third exemplary embodiment.

In a third exemplary embodiment, a case where the optical encoder of the first or second exemplary embodiment described above is incorporated in a robot arm will be described. FIG. 12 is a perspective view of a robot apparatus 100 according to the third exemplary embodiment. As illustrated in FIG. 12, the robot apparatus 100 is a vertically articulated robot, and includes a robot 200 serving as a manipulator and a robot control apparatus 300 serving as an example of a controller that controls the operation of the robot 200. In addition, the robot apparatus 100 includes a teaching pendant 400 serving as a teaching device that transmits teaching data to the robot control apparatus 300, and a display 700 serving as a display apparatus. The teaching pendant 400 is operated by an operator to designate an operation of the robot 200 or the robot control apparatus 300.

The robot 200 includes a robot arm 251 and a robot hand 252 serving as an example of an end effector attached to the distal end of the robot arm 251. The proximal end of the robot arm 251 is fixed to a base 150. The robot hand 252 is configured to grip an object serving as a workpiece such as a part or a tool.

The robot arm 251 includes a plurality of joints, for example, six joints $J_1$ to $J_6$. The robot arm 251 includes electric motors $220_1$ to $220_6$ serving as examples of driving portions that respectively rotationally drive the joints $J_1$ to $J_6$ about joint axes $A_1$ to $A_6$.

The robot arm 251 includes a plurality of links $210_0$ to $210_6$ rotatably coupled via the joints $J_1$ to $J_6$. In the third exemplary embodiment, the links $210_0$ to $210_6$ are coupled in series in this order from the proximal end side toward the distal end side. The robot arm 251 can direct the distal end thereof in an arbitrary orientation in three axes at an arbitrary three-dimensional position within a movable range. To be noted, although a case where the joints of the robot arm 251 are rotary joints will be described, the joints may be linear joints. A "position of a joint" refers to a rotation angle in the case where the joint is a rotary joint, and refers to a translational position of the joint in the case where the joint is a linear joint.

In addition, the robot arm 251 includes encoders $50_1$ to $50_6$ that are optical rotary encoders respectively disposed at the joints $J_1$ to $J_6$. The encoders $50_1$ to $50_6$ are each a rotary encoder to which the optical encoder described above in the first or second exemplary embodiment is applied, and respectively output signals indicating the position information, that is, angle information of the joints $J_1$ to $J_6$.

The robot control apparatus 300 is connected to a servo control device 350 serving as a driving controller that causes the electric motors $220_1$ to $220_6$ to operate. The servo control device 350 outputs, on the basis of position instructions, that is, angle instructions respectively corresponding to the joints $J_1$ to $J_6$, currents to the electric motors $220_1$ to $220_6$ such that the joints $J_1$ to $J_6$ follow the angle instructions, and thus performs feedback control of the electric motors $220_1$ to $220_6$. To be noted, although the servo control device 350 is disposed inside the robot control apparatus 300 in the third exemplary embodiment, the configuration is not limited to this. For example, the servo control device 350 may be disposed inside the robot arm 251.

Figure 13A:
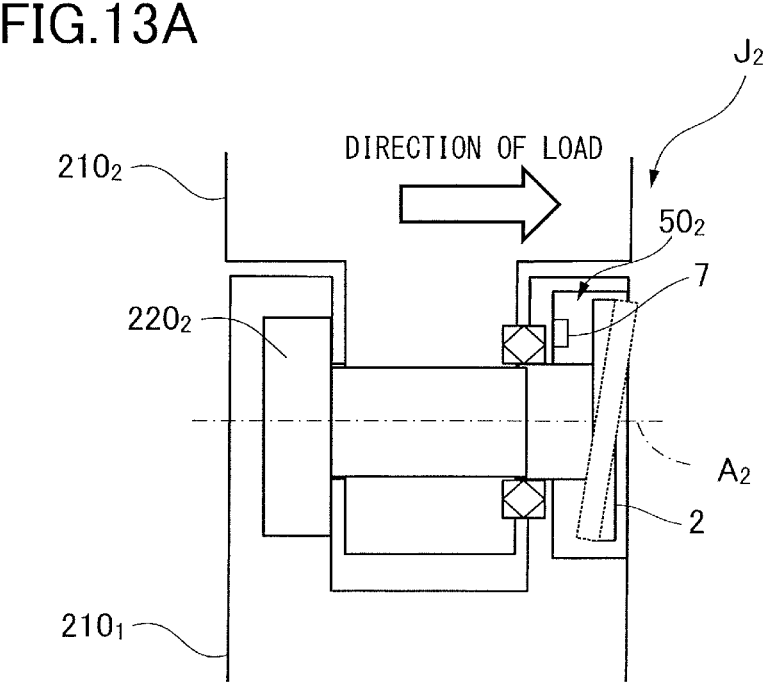
FIG. 13A is a section view of a joint according to the third exemplary embodiment.
Figure 13B:
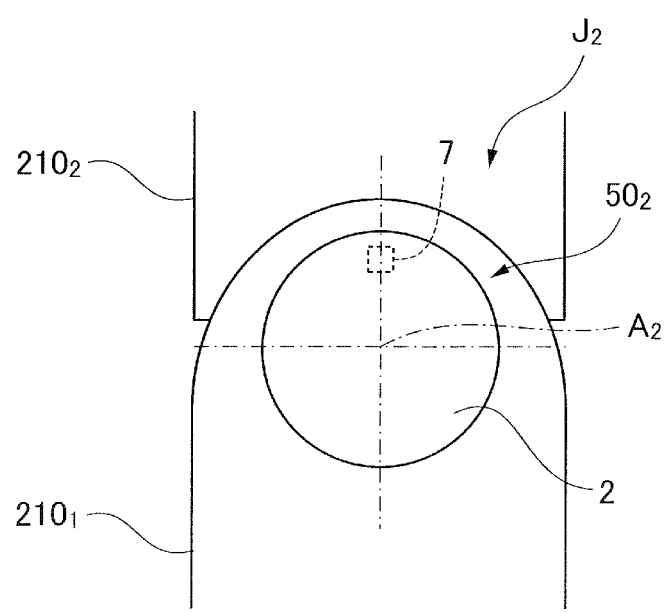
FIG. 13B is a side view of the joint according to the third exemplary embodiment.

FIG. 13A is a section view of the joint $J_2$ of the robot arm 251. FIG. 13B is a side view of the joint $J_2$ of the robot arm 251. Although the configuration of the joint $J_2$ of the robot arm 251 will be described below, the joints $J_1$ and $J_3$ to $J_6$ each have a similar configuration to the joint $J_2$, and thus description of the configurations of the joints $J_1$ and $J_3$ to $J_6$ will be omitted.

The link $210_1$ serving as an example of a first link and the link $210_2$ serving as an example of a second link are coupled via the joint $J_2$, and the link $210_2$ relatively rotates at the joint $J_2$ about the rotation axis $A_2$ with respect to the link $210_1$.

The electric motor $220_2$ serving as an example of a driving portion is disposed in the joint $J_2$ so as to rotationally drive the link $210_2$ with respect to the link $210_1$. In addition, the encoder $50_2$ that measures a rotation angle serving as the position of the link $210_2$ with respect to the link $210_1$ is disposed at the joint $J_2$. The head 7 of the encoder 502 is provided at one of the links $210_1$ and $210_2$, for example, at the link $210_1$. The scale portion 2 of the encoder $50_2$ is provided at the other of the links $210_1$ and $210_2$, for example, at the link $210_2$.

Figure 14:
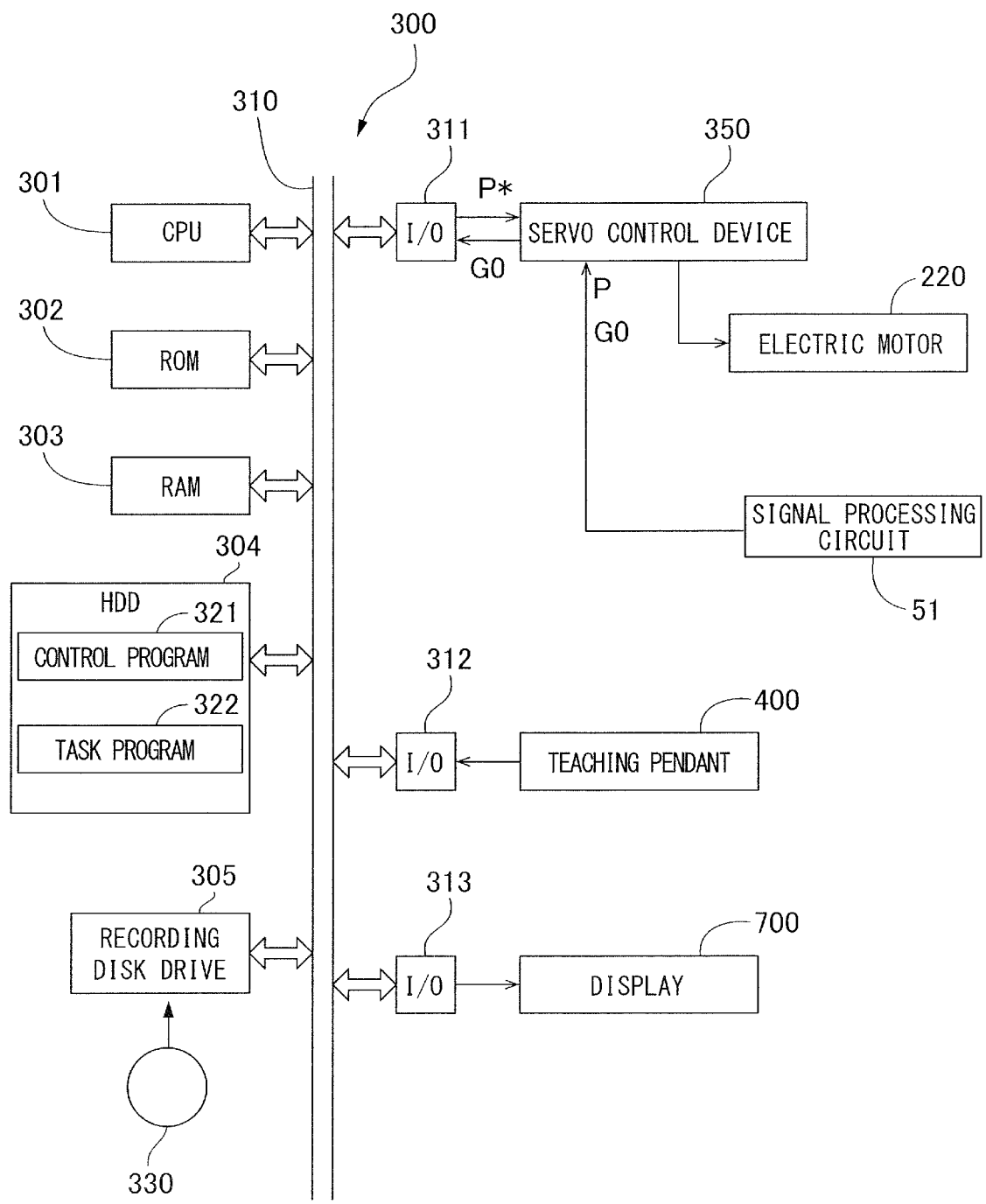
FIG. 14 is a block diagram illustrating a control system of the robot apparatus according to the third exemplary embodiment.

FIG. 14 is a block diagram illustrating a control system of the robot apparatus 100 according to the third exemplary embodiment. The robot control apparatus 300 is constituted by a computer. The robot control apparatus 300 includes a central processing unit: CPU 301. In addition, the robot control apparatus 300 includes a read only memory: ROM 302, a random access memory: RAM 303, and a hard disk drive: HDD 304 serving as examples of a storage portion. In addition, the robot control apparatus 300 includes a recording disk drive 305 and input/output interfaces: I/Os 311 to 313.

The CPU 301, the ROM 302, the RAM 303, the HDD 304, the recording disk drive 305, and the I/Os 311 to 313 are communicably interconnected via a bus 310. The I/O 311 is connected to the servo control device 350, the I/O 312 is connected to the teaching pendant 400, and the I/O 313 is connected to the display 700.

The servo control device 350 is connected to an electric motor 220 and the signal processing circuit 51 of each of the joints $J_1$ to $J_6$. To be noted, although the electric motor 220 and the signal processing circuit 51 for one joint is illustrated in FIG. 3, electric motors 220 and signal processing circuits 51 for six joints are connected to the servo control device 350.

The CPU 301 controls the operation of the robot 200 by controlling, via the servo control device 350, the operation of the electric motors 220 respectively driving the joints $J_r$ to $J_6$ of the robot 200. In addition, the CPU 301 receives an instruction transmitted from the teaching pendant 400 by an operation of an operator. Further, the CPU 301 controls the display 700 to display an image on the display 700.

The HDD 304 stores a control program 321 and a task program 322. The recording disk drive 305 is capable of reading out various data and programs recorded in a recording disk 330.

The control program 321 is a program that causes the CPU 301 to interpret the task program 322, generate trajectory data of the robot arm 251, and perform various calculation and various control. The control program 321 is configured such that the control program 321 cannot be easily modified by a user. The task program 322 is, for example, a text file described in a robot language, and can be modified by a user or a computer. The CPU 301 loads the task program 322, generates trajectory data connecting teaching points by a predetermined interpolation method, for example, linear interpolation or circular interpolation, and stores the trajectory data in the HDD 304. In the case of the linear interpolation, trajectory data causing linear movement of the distal end of the robot arm 251 is generated. The CPU 301 converts data of point data of the trajectory data into rotation angles of the joints $J_r$ to $J_6$ by inverse kinematic calculation of the robot, and outputs an angle instruction P* serving as a position instruction to the servo control device 350.

The signal processing circuit 51 of the encoder apparatus outputs a signal indicating the position information, that is, angle information P of the joint to the servo control device 350. The servo control device 350 controls the currents supplied to the electric motors 220 such that the angle information P obtained from the signal processing circuit 51 is the angle instruction P*. According to this feedback control, the robot control apparatus 300 operates the robot arm 251 in accordance with the trajectory data.

Incidentally, there is an appropriate range of the gap between the scale portion 2 and the head 7 for the signal processing circuit 51 such that the signal amplitude is not too small and that a high-frequency wave is not superimposed on a signal waveform, that is, such that the position information can be measured with a high precision. Therefore, when incorporating the encoders $50_1$ to $50_6$ in the joints $J_1$ to $J_6$ of the robot arm 251, the robot arm 251 needs to be adjusted such that the gap is within the appropriate range.

Therefore, in the third exemplary embodiment, the servo control device 350 receives a signal indicating the measured value G0 of the gap corresponding to each of the joints $J_1$ to $J_6$ from the corresponding signal processing circuit 51, and transmits the signal indicating the measured value G0 to the robot control apparatus 300. To be noted, the signal processing circuit 51 may directly transmit the measured value G0 to the robot control apparatus 300.

The robot control apparatus 300 causes the display 700 to display an image indicating the measured value G0 of the gap. As a result of this, an assembly operator of the robot 200 can judge whether the gap is within the range appropriate for position measurement, and adjustment of the gap becomes easier. As a result of this, costs for assembly by the robot 200 can be greatly reduced.

To be noted, although a case where one head 7 is provided for one joint has been described above, two heads 7 may be provided for one joint at positions rotated by approximately 180° with respect to the rotation axis of the scale portion 2. In this case, the amount of inclination of the scale portion 2 caused by distortion of the joint can be also measured.

The robot 200 produced in this manner are disposed in a production line. The robot 200 is caused to perform a predetermined operation of manufacturing an article, for example, an operation of mounting a first workpiece W10 illustrated in FIG. 12 on a second workpiece W20. Specifically, the robot control apparatus 300 controls the robot 200 to cause the robot hand 252 to hold the first workpiece W10, cause the robot hand 252 holding the first workpiece W10 to move toward the second workpiece W20, and cause the robot hand 252 to perform the operation of mounting the first workpiece W10 on the second workpiece W20.

When the robot arm 251 is operated, the joint sometimes vibrates as a result of the links of the robot arm 251 being warped depending on the operation condition thereof. When the joint is vibrating, the distal end of the robot arm 251 also vibrates. When the distal end of the robot arm 251 is vibrating, for example, precise assembly cannot be performed in the assembly operation, and sometimes the assembly fails.

Therefore, the robot control apparatus 300 temporarily stops operation of the robot arm 251, that is, driving of the electric motors 220 of the joints before causing the electric motors 220 of the joints, that is, the robot 200 to start the assembly operation as a predetermined operation. The operation of the robot arm 251 is temporarily stopped for settling the vibration of the robot arm 251.

Figure 15:
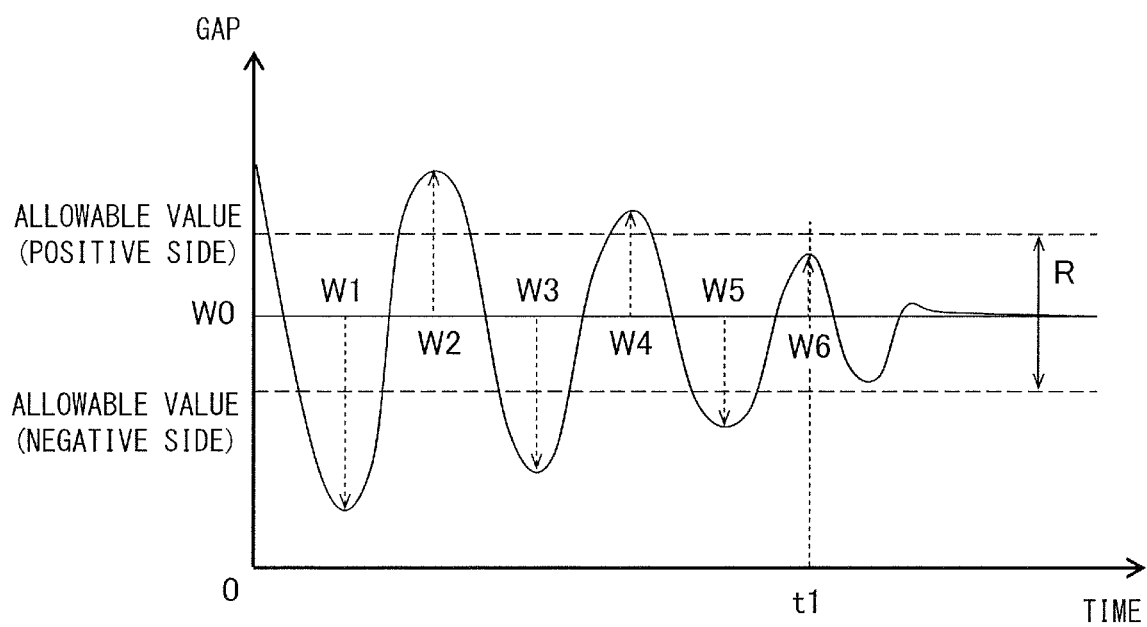
FIG. 15 is a graph illustrating vibration of the joint according to the third exemplary embodiment.

FIG. 15 is a graph illustrating the vibration of the joint $J_2$. In the third exemplary embodiment, the robot control apparatus 300 obtains vibration amplitude values W1, W2, W3, . . . in real time on the basis of the measured value G0 of the gap. The vibration amplitude values W1, W2, W3, . . . are peak values of vibration with respect to a target value W0 of the link $210_2$ vibrating with respect to the link $210_1$. The robot control apparatus 300 determines whether the vibration amplitude values W1, W2, W3, . . . are within an allowable range R. In the example of FIG. 15, the vibration amplitude value W6 is within the allowable range R at a timing t1. Although only the vibration of the joint $J_2$ is illustrated in FIG. 15, it is assumed that the vibration of all the joints settles in the allowable range R at the timing t1. To be noted, the allowable range R is individually set for each joint in accordance with the content of operation of the robot arm 251 or precision requirement thereof. The robot control apparatus 300 causes the electric motors 220 of the respective joints, that is, the robot 200 to start a predetermined operation at a timing as early as possible after the timing t1 in the case where the vibration of the joints of the robot arm 251 has settled.

As described above, the assembly operation is started after the vibration of the robot arm 251 has settled, and thus the robot 200 can perform a highly-precise assembly operation. To be noted, the predetermined operation is not limited to the assembly operation.

Since the robot control apparatus 300 judges whether the vibration has settled by monitoring the vibration amplitude values W1, W2, W3, . . . , a waiting time can be shortened and thus the operation efficiency can be improved as compared with a case where the operation is performed after waiting for a predetermined sufficient time to elapse.

To be noted, the present invention is not limited to the exemplary embodiments described above, and can be modified in various ways within the technical concept of the present invention. In addition, the effects described in the exemplary embodiments are merely enumeration of most preferable effects that can be achieved by the present invention, and effects of the present invention are not limited to the effects described in the exemplary embodiments.

Modification Examples

Figure 16:
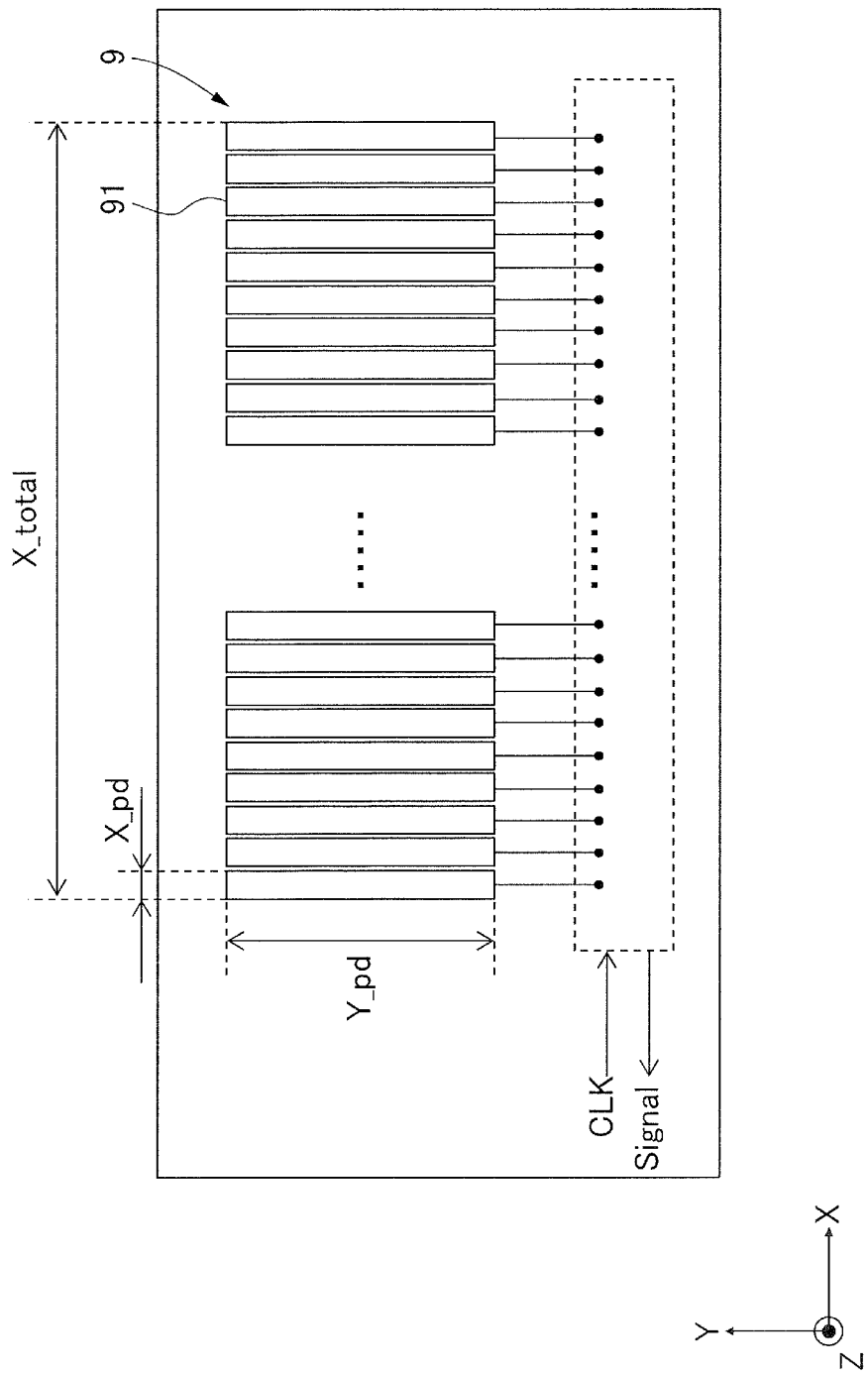
FIG. 16 is a plan view of a light receiving element array according to a modification example.
Figure 17:
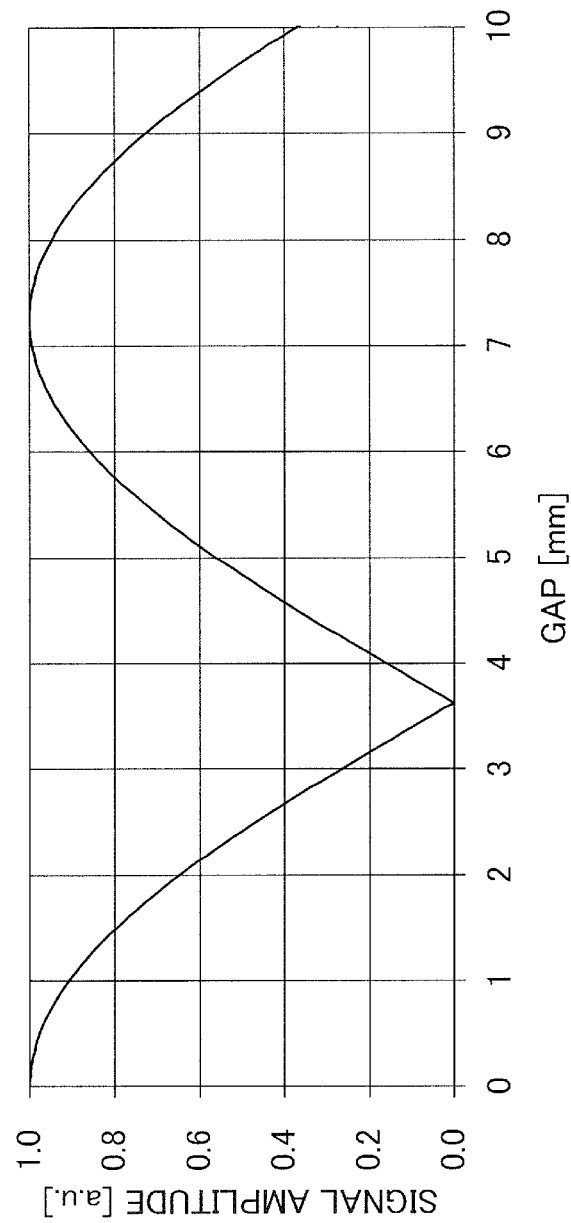
FIG. 17 is a graph illustrating a relationship between a gap and a signal amplitude in a prior art.

FIG. 16 is a plan view of the light receiving element array 9 in a modification example. As illustrated in FIG. 16, the light receiving element array 9 may be a linear image sensor from which "Signal", which represents output signals corresponding to amounts of light received by the plurality of respective light receiving elements 91 that perform photoelectric conversion, can be sequentially taken out in synchronization with a clock timing "CLK". The signal processing circuit 51 is capable of sequentially taking out the output signals from the plurality of light receiving elements 91 and collectively processing the output signals. Therefore, there is no need to obtain periodic signals corresponding to the respective light receiving elements 91 with a time difference therebetween by performing switching by the switch circuit 41 illustrated in FIG. 3 or FIG. 4 as described above in the first exemplary embodiment. The signal processing circuit 51 processes the signals collectively received from the plurality of light receiving elements 91 to generate the A-phase signal S1(A), the B-phase signal S1(B), the A-phase signal S2(A), and the B-phase signal S2(B). As a method for separating each periodic signal component of the tracks 11 and 12 from a linear image signal detected by the light receiving element array 9, fast Fourier transform: FFT processing may be performed, or the linear image signal may be converted into four-phase sine waves corresponding to respective periods.

In addition, although a case where the encoder is of a reflection type has been described above in the first to third exemplary embodiments, the configuration is not limited to this, and the encoder may be of a transmission type. In the case of the transmission type, a scale portion is relatively movably disposed between light receiving portions. In this case, pattern elements in each track include a light transmitting portion that is a slit, and a light shielding portion.

In addition, although a case where the encoder is applied to a robot arm has been described above in the third exemplary embodiment, the encoder can be also applied to various apparatuses other than robots. For example, the encoder can be used for gap adjustment or detection of a distortion state of a rotation shaft at the time of rotational driving in the case of incorporating the encoder in a lens barrel of a surveillance camera including a rotational driving mechanism for each of pan, which is the horizontal direction, and tilt, which is the vertical direction.

In addition, although a vertically articulated robot has been described above in the third exemplary embodiment, the configuration is not limited to this. For example, the encoder can be applied to various robots such as a horizontally articulated robot, a parallel link robot, and an orthogonal robot.

In addition, although a case where the scale portion 2 includes two different tracks 11 and 12 has been described, the scale portion 2 may include three or more tracks having different pitches. In this case, the gap can be measured by using periodic signals from two of the plurality of tracks.

In addition, although a case where the scale portion 2 is constituted by the two tracks 11 and 12 alternately arranged in parallel in the Y direction and the periodic signals respectively corresponding to the tracks 11 and 12 are obtained by using one light receiving element array 9 has been described above in the first to third exemplary embodiments, the configuration is not limited to this. The scale portion 2 may be constituted by disposing the track 11 and the track 12 separately, and periodic signals respectively corresponding to the tracks 11 and 12 may be obtained by providing the light receiving element array 9 for each of the tracks 11 and 12.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-237063, filed Dec. 11, 2017, which is hereby incorporated by reference herein in its entirety.

What is claimed is:

1. An encoder apparatus comprising:
an encoder and a processor,
wherein the encoder comprises a scale portion, a light emitting portion, and a light receiving portion,
wherein the scale portion comprises:
a first track comprising a plurality of first pattern elements periodically arranged at a first pitch; and
a second track comprising a plurality of second pattern elements periodically arranged at a second pitch larger than the first pitch,
wherein the light emitting portion comprises a light emitting surface and is configured to radiate light from the light emitting surface onto the first track and the second track,
wherein the light receiving portion is configured to receive light reflected on or transmitted through the first track and light reflected on or transmitted through the second track,
wherein the processor is configured to measure a value of a gap between the light emitting surface of the light emitting portion and the scale portion, and
wherein the processor obtains a plurality of candidate values of the gap between the light emitting surface of the light emitting portion and the scale portion on a basis of a first signal obtained by receiving the light reflected on or transmitted through the first track by the light receiving portion, and determines the measured value from among the plurality of candidate values on a basis of a second signal obtained by receiving the light reflected on or transmitted through the second track by the light receiving portion.

2. The encoder apparatus according to claim 1, wherein the processor obtains the plurality of candidate values by using a predetermined formula or a predetermined table.

3. The encoder apparatus according to claim 1,
wherein the light emitting portion comprises a plurality of light emitting elements configured to perform photoelectric conversion, and
wherein the processor receives, from the plurality of light receiving elements, a signal obtained by receiving the light reflected on or transmitted through the first track and a signal obtained by receiving the light reflected on or transmitted through the second track with a time difference therebetween by switching how signals are loaded from the plurality of light receiving elements, generates the first signal from the signal obtained by receiving the light reflected on or transmitted through the first track, and generates the second signal from the signal obtained by receiving the light reflected on or transmitted through the second track.

4. The encoder apparatus according to claim 1,
wherein the light receiving portion comprises a plurality of light receiving elements configured to perform photoelectric conversion, and
wherein the processor generates the first signal and the second signal from signals collectively received from the plurality of light receiving elements.

5. A camera comprising:
a lens barrel comprising the encoder according to claim 1.

6. The encoder apparatus according to claim 1, wherein the processor obtains the plurality of candidate values of the gap between the light emitting surface of the light emitting portion and the scale portion on a basis of an amplitude of the first signal obtained by receiving the light reflected on or transmitted through the first track by the light receiving portion, and determines the measured value from among the plurality of candidate values on a basis of an amplitude of the second signal obtained by receiving the light reflected on or transmitted through the second track by the light receiving portion.

7. The encoder apparatus according to claim 6, wherein the processor obtains a reference value on the basis of the amplitude of the second signal, and determines a candidate value closest to the reference value among the plurality of candidate values as the measured value.

8. The encoder apparatus according to claim 7,
wherein the amplitude of the first signal changes at a first period with respect to change of the gap between the light emitting surface of the light emitting portion and the scale portion,
wherein the amplitude of the second signal changes at a second period longer than the first period with respect to the change of the gap between the light emitting surface of the light emitting portion and the scale portion, and
wherein the processor measures the value within a range wider than a half of the first period and equal to or narrower than a half of the second period.

9. The encoder apparatus according to claim 6,
wherein the first signal and the second signal each comprise an A-phase signal and a B-phase signal whose phase is shifted by 90° from a phase of the A-phase signal, and
wherein the amplitude of the first signal and the amplitude of the second signal are each an amplitude of the A-phase signal, an amplitude of the B-phase signal, or an average of the amplitude of the A-phase signal and the amplitude of the B-phase signal.

10. A robot apparatus comprising:
a robot and a controller,
wherein the robot comprises:
a first link;
a second link movably coupled to the first link via a joint;
a driving portion configured to drive the second link with respect to the first link; and
an encoder comprising a scale portion, a light emitting portion, and a light receiving portion,
wherein the scale portion comprises:
a first track comprising a plurality of first pattern elements periodically arranged at a first pitch; and
a second track comprising a plurality of second pattern elements periodically arranged at a second pitch larger than the first pitch, wherein the light emitting portion comprises a light emitting surface and is configured to radiate light from the light emitting surface onto the first track and the second track, wherein the light receiving portion is configured to receive light reflected on or transmitted through the first track and light reflected on or transmitted through the second track, wherein the controller is configured to control an operation of the driving portion, wherein the light emitting portion and the light receiving portion are provided at one of the first link and the second link, and wherein the scale portion is provided at the other of the first link and the second link.

11. The robot apparatus according to claim 10, further comprising:
a processor configured to measure a value of a gap between the light emitting surface of the light emitting portion and the scale portion, wherein the processor obtains a plurality of candidate values of the gap between the light emitting surface of the light emitting portion and the scale portion on a basis of a first signal obtained by receiving the light reflected on or transmitted through the first track by the light receiving portion, and determines the value from among the plurality of candidate values on a basis of a second signal obtained by receiving the light reflected on or transmitted through the second track by the light receiving portion.

12. The robot apparatus according to claim 11, wherein the processor obtains the plurality of candidate values of the gap between the light emitting surface of the light emitting portion and the scale portion on a basis of an amplitude of the first signal obtained by receiving the light reflected on or transmitted through the first track by the light receiving portion, and determines the measured value from among the plurality of candidate values on a basis of an amplitude of the second signal obtained by receiving the light reflected on or transmitted through the second track by the light receiving portion.

13. The robot apparatus according to claim 12,
wherein the controller obtains, on a basis of the value of the gap measured by the processor, a vibration amplitude value of the second link vibrating with respect to the first link, and wherein the controller causes the driving portion to start a predetermined operation after the vibration amplitude value has settled at a predetermined value.

14. A method for measuring a gap, the method comprising:
preparing an encoder comprising a scale portion, a light emitting portion, and a light receiving portion,
wherein the scale portion comprises:
a first track comprising a plurality of first pattern elements periodically arranged at a first pitch; and
a second track comprising a plurality of second pattern elements periodically arranged at a second pitch larger than the first pitch,
wherein the light emitting portion comprises a light emitting surface and is configured to radiate light from the light emitting surface onto the first track and the second track, and
wherein the light receiving portion is configured to receive light reflected on or transmitted through the first track and light reflected on or transmitted through the second track;

obtaining a plurality of candidate values of a gap between the light emitting surface of the light emitting portion and the scale portion on a basis of a first signal obtained by receiving the light reflected on or transmitted through the first track by the light receiving portion; and measuring a value of the gap between the light emitting surface of the light emitting portion and the scale portion from among the plurality of candidate values on a basis of a second signal obtained by receiving the light reflected on or transmitted through the second track by the light receiving portion.

15. The method according to claim 14, wherein
the obtaining obtains the plurality of candidate values of the gap between the light emitting surface of the light emitting portion and the scale portion is performed on a basis of an amplitude of the first signal obtained by receiving the light reflected on or transmitted through the first track by the light receiving portion; and the measuring measures the value of the gap between the light emitting surface of the light emitting portion and the scale portion from among the plurality of candidate values on a basis of an amplitude of a second signal obtained by receiving the light reflected on or transmitted through the second track by the light receiving portion.

16. A method for controlling a robot, the method comprising:
preparing the robot comprising a first link, a second link coupled to the first link via a joint, and an encoder apparatus disposed between the first link and the second link, the encoder apparatus comprising:
an encoder and a processor,
wherein the encoder comprises a scale portion, a light emitting portion, and a light receiving portion,
wherein the scale portion comprises:
a first track comprising a plurality of first pattern elements periodically arranged at a first pitch; and
a second track comprising a plurality of second pattern elements periodically arranged at a second pitch larger than the first pitch,
wherein the light emitting portion comprises a light emitting surface and is configured to radiate light from the light emitting surface onto the first track and the second track,
wherein the light receiving portion is configured to receive light reflected on or transmitted through the first track and light reflected on or transmitted through the second track,
wherein the processor is configured to measure a value of a gap between the light emitting surface of the light emitting portion and the scale portion, and
wherein the processor obtains a plurality of candidate values of the gap between the light emitting surface of the light emitting portion and the scale portion on a basis of a first signal obtained by receiving the light reflected on or transmitted through the first track by the light receiving portion, and determines the measured value from among the plurality of candidate values on a basis of a second signal obtained by receiving the light reflected on or transmitted through the second track by the light receiving portion;

obtaining, on a basis of the value of the measured gap determined by the processor of the encoder apparatus, a vibration amplitude value of the second link vibrating with respect to the first link; and causing the robot to start a predetermined operation after the vibration amplitude value has settled at a predetermined value.

17. A non-transitory computer-readable recording medium storing a program for causing the computer to execute the method according to claim 16.

18. A method for manufacturing an article, the method comprising:
  preparing a robot comprising a first link, a second link coupled to the first link via a joint, and an encoder apparatus disposed between the first link and the second link, the encoder apparatus comprising:
    an encoder and a processor,
    wherein the encoder comprises a scale portion, a light emitting portion, and a light receiving portion,
    wherein the scale portion comprises:
      a first track comprising a plurality of first pattern elements periodically arranged at a first pitch; and
      a second track comprising a plurality of second pattern elements periodically arranged at a second pitch larger than the first pitch,
    wherein the light emitting portion comprises a light emitting surface and is configured to radiate light from the light emitting surface onto the first track and the second track,
    wherein the light receiving portion is configured to receive light reflected on or transmitted through the first track and light reflected on or transmitted through the second track,
    wherein the processor is configured to measure a value of a gap between the light emitting surface of the light emitting portion and the scale portion, and
    wherein the processor obtains a plurality of candidate values of the gap between the light emitting surface of the light emitting portion and the scale portion on a basis of a first signal obtained by receiving the light reflected on or transmitted through the first track by the light receiving portion, and determines the measured value from among the plurality of candidate values on a basis of a second signal obtained by receiving the light reflected on or transmitted through the second track by the light receiving portion;
  obtaining, on a basis of the value of the measured gap determined by the processor of the encoder apparatus, a vibration amplitude value of the second link vibrating with respect to the first link; and
  starting an operation of mounting a first workpiece held by the robot on a second workpiece after the vibration amplitude value has settled at a predetermined value.

* * * * *